(12) United States Patent
Hsu

(10) Patent No.: US 11,301,006 B2
(45) Date of Patent: Apr. 12, 2022

(54) HINGE MODULE AND A FOLDABLE TYPE DEVICE WITH THE SAME

(71) Applicant: Jarllytec Co., Ltd., New Taipei (TW)

(72) Inventor: Yu-Tsun Hsu, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 105 days.

(21) Appl. No.: 16/912,304

(22) Filed: Jun. 25, 2020

(65) Prior Publication Data
US 2020/0409429 A1 Dec. 31, 2020

(30) Foreign Application Priority Data

Jun. 27, 2019 (TW) .................................. 108122618
Dec. 13, 2019 (TW) .................................. 108145891

(51) Int. Cl.
| | |
|---|---|
| *G06F 1/16* | (2006.01) |
| *E05D 11/06* | (2006.01) |
| *E05D 3/12* | (2006.01) |
| *F16C 11/04* | (2006.01) |

(52) U.S. Cl.
CPC ............ *G06F 1/1681* (2013.01); *E05D 11/06* (2013.01); *F16C 11/04* (2013.01); *G06F 1/1616* (2013.01); *G06F 1/1637* (2013.01); *E05D 3/122* (2013.01); *E05Y 2900/606* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 9,759,242 | B2* | 9/2017 | Hsu | ...................... | F16M 11/10 |
| 9,879,715 | B1* | 1/2018 | Hsu | ...................... | E05D 11/00 |
| 10,001,162 | B2* | 6/2018 | Hsu | ...................... | F16M 11/245 |
| 10,001,815 | B1* | 6/2018 | Yao | ...................... | F16M 13/005 |
| 10,429,896 | B2* | 10/2019 | Kuramochi | ........... | G06F 1/1616 |
| 10,963,020 | B2* | 3/2021 | Kim | ...................... | G06F 1/1681 |
| 11,009,061 | B2* | 5/2021 | Chang | ...................... | E05D 3/18 |
| 11,016,541 | B2* | 5/2021 | Lin | ...................... | E05D 3/122 |
| 11,129,287 | B2* | 9/2021 | Hsu | ...................... | H05K 7/1401 |

(Continued)

FOREIGN PATENT DOCUMENTS

| | | |
|---|---|---|
| CN | 109488681 A | 3/2019 |
| CN | 110206814 A | 9/2019 |

*Primary Examiner* — Lisa Lea-Edmonds
(74) *Attorney, Agent, or Firm* — Muncy, Geissler, Olds & Lowe, P.C.

(57) ABSTRACT

The present invention provides a hinge module and a foldable type device with the same. In the hinge module, a first curved guiding portion and a second curved guiding portion are provided between two lateral surfaces of a curved body, and a first connecting portion of a first rotating member is connected with a first support plate. At least one of the first curved blocks of the first rotating member is swingable and limited within the first curved guiding portion. A second connecting portion of a second rotating member is connected with a second support plate. At least one of the second curved blocks of the second rotating member is swingable and limited within the second curved guiding portion. A first linkage assembly has one end pivotally connected with one side of the first curved block. A second linking member is provided at another end of the two linkage assemblies.

14 Claims, 18 Drawing Sheets

(56) References Cited

U.S. PATENT DOCUMENTS

| | | | |
|---|---|---|---|
| 2016/0097227 A1* | 4/2016 | Hsu | F16B 1/00 |
| | | | 16/354 |
| 2017/0208703 A1* | 7/2017 | Lin | H05K 7/16 |
| 2019/0390703 A1* | 12/2019 | Hsu | E05D 11/082 |
| 2020/0371561 A1* | 11/2020 | Lin | G06F 1/1681 |
| 2020/0401193 A1* | 12/2020 | Hsu | G06F 1/1681 |
| 2021/0055763 A1* | 2/2021 | Park | E05D 1/04 |
| 2021/0120687 A1* | 4/2021 | Kim | H05K 5/0226 |
| 2021/0318723 A1* | 10/2021 | Cheng | G06F 1/1652 |
| 2021/0355988 A1* | 11/2021 | Cheng | F16C 11/10 |

* cited by examiner

HINGE MODULE AND A FOLDABLE TYPE DEVICE WITH THE SAME

FIELD OF THE INVENTION

The present invention is related to a hinge, and particularly to a hinge module and a foldable type device with the same.

BACKGROUND OF THE INVENTION

In general for electronic devices, in terms of conventional foldable devices, a display and a base of a notebook computer, are mainly connected with each other through a single folio type hinge that is respectively connected with the lateral side of the display and the base to form a pivoting connection, thereby making the display folded or unfolded in an reverse direction relative to the base. In recent years, there are foldable devices of which conventional displays and bases are replaced by at least two bodies for being used together with a flexible display. For example, Chinese Patent entitled with "a hinge module for the foldable device" with application number No. CN201810371007.2 (referring to Citation 1), Citation 1 has disclosed that in an embodiment of Citation 1, Citation 1 mainly includes a first support member, a folio type hinge, a second support member, a multi-axis shaft, and a third support member for being used together with a flexible display, thereby after the flexible display is folded to be in an S-shape or a Z-shape, the first support member and the second support member interconnected by the folio type hinge can be closed through "a single virtual rotation center", and an accommodating space is formed inside the folio type hinge to accommodate a curved portion of the flexible display.

For the subsequent improvement, such as the Chinese Patent entitled with "a hinge module for the foldable device" with application number no. CN109488681A (referring to Citation 2), it further includes technical features of "a cover plate together with a swinging member", such that during the overall folding and unfolding process, a free swinging effect similar to a seesaw can be generated. When the device of Citation 2 is folded, an accommodating space can be formed to accommodate the curved middle portion of the flexible display, and when the device of Citation 2 is unfolded, the flattened middle portion of the flexible display can be stably supported.

Therefore, the applicant subsequently filed a Chinese patent application entitled with "The Hinge Module for a Foldable Type Device" with application number no. CN201910587928.7 (referred as Citation 3) in order to simplify the operation of "the hinge modules" in Citations 1 and 2. "The single virtual rotation center" is replaced with the dual virtual rotation center and the two rotating parts to rotate synchronously with respect to the curved seat body is used to replace the compensation operation generated by "the shaft-free seesaw structure." "The shaft-free seesaw structure" and its resulting compensation operation are removed, and then the overall thickness is reduced to facilitate the design, and the problem that existent flexible displays have small curvatures when being folded is solved, so as to prolong the service life of the flexible display.

SUMMARY OF THE INVENTION

The "single virtual rotation center" used in Citation 1 or the "shaft-free seesaw" used in Citation 2 all requires that the curved portion of the flexible display should have a small curvature after the two bodies of the foldable device are folded, thereby making the overall structure thinner. However, there are differences in respect of the current technological development among various display manufacturers, that is, not all flexible displays will have a small curvature in their curved parts, or they might have different curved patterns under small curvatures. Therefore, for those flexible displays with different curved patterns, a corresponding appropriate hinge module is required instead of adopting the structural designs of Citation 1 and Citation 2, so as to reduce damages made to the flexible display. Furthermore, in Citation 3, after the two bodies are folded with each other, the common bent end of the two bodies forms a roughly triangular gap, so that the flexible display inside the two bodies are exposed. However, in this way, dust or moisture can be allowed to enter through this gap, thereby making the flexible display dirty, and even causing the problem of damage to the flexible display. In view of this, in order to provide a structure different from prior art and to improve the above disadvantages, the inventor has continuously researched, so as to provide the present invention.

One object of the present invention is to provide a hinge module and a foldable type device with the same, which can simplify the operation of the hinge module of the previous Citations 1 or 2, and changes the "single virtual rotation center" of Citation 1 to "dual virtual rotation centers", and the compensation operation produced by the shaft-free seesaw like structure is replaced with "two rotating members to rotate synchronously with respect to the curved body". In addition, the "shaft-free seesaw" structure in Citation 2 and its compensation operation are further removed, and the overall thickness is reduced to improve overall designs, so as to meet the market demand of being lighter and thinner to promote sales, and the service life of the existing flexible display is thus prolonged under the limitations of the small curvature of the existing flexible display when the existing flexible display is folded. The secondary object of the present invention is to provide a hinge module and a foldable type device with the hinge module, and in addition to removing parts of the overall components and simplifying the rotating shaft linkage structures of "the first and second linkage members" in Citations 1 and 2, so as to save manufacturing and assembling costs, and it also allows the two bodies to be fully folded to each other, and to effectively hide the flexible display, thereby prolonging the service life of the flexible display.

In order to fulfill the object of the present invention, the hinge device comprises a curved body, a first rotating member, a second rotating member, and a first linkage assembly and a second linkage assembly. The curved body has two lateral surfaces that are oppositely provided, where a first curved guiding portion and a second curved guiding portion are juxtaposed and spaced from each other between the two lateral surfaces. The first rotating member includes a first connecting portion and at least one first curved block, where the first connecting portion is connected with a first support plate; the at least one first curved block is swingable and limited within the first curved guiding portion. The second rotating member includes a second connecting portion and at least one second curved block, where the second connecting portion is connected with a second support plate, and the at least one second curved block is swingable and limited within the second curved guiding portion. The first linkage assembly has one end pivotally connected with one side of the first curved block of the first rotating member, and another end of the first linkage assembly being provided with a first linkage member. The second linkage assembly has one end pivotally connected with one side of the second curved block of the second rotating member, and another end of the second linkage assembly is provided with a second linkage member, where the second linkage member is movably connected with the first linkage member in a reverse direction.

In order to fulfill the object of the present invention, the hinge device of the second embodiment of the present invention comprises a curved body, a first rotating member, a second rotating member, a first linkage assembly and a second linkage assembly. The curved body has two lateral surfaces that are oppositely provided, where a first curved guiding portion and a second curved guiding portion are juxtaposed and spaced from each other between the two lateral surfaces. The first rotating member includes a first connecting portion and at least one first curved block, where the first connecting portion is connected with a first support plate; the at least one first curved block is swingable and limited within the first curved guiding portion. A lateral end of the at least one first curved block has at least one first positioning portion for pressing one end of a first telescopic element, thereby limiting a swing angle of the at least one first curved block. A second rotating member includes a second connecting portion and at least one second curved block, where the second connecting portion is connected with a second support plate, and the at least one second curved block is swingable and limited within the second curved guiding portion. A lateral end of the at least one second curved block has at least one second positioning portion for pressing one end of a second telescopic element, thereby limiting a swing angle of the at least one second curved block. A first linkage member has one end pivotally connected with another lateral end of the at least one first curved block of the first rotating member, thereby when the at least one first curved block is swung, the first linkage member is moved linearly. A second linkage member is in a reversely movable connection with the first linkage member, wherein one end of the second linkage member is pivotally connected with another lateral end of the at least one second curved block of the second rotating member, thereby when the at least one second curved block is swung, the second linkage member is moved linearly.

In order to fulfill the object of the present invention, a foldable device of the present invention further comprises a first body, a second body and a flexible display, wherein the first support plate is pivotally provided in the first body, and the second support plate is pivotally provided in the second body. The first support plate and the second support plate are respectively connected with two halves of the flexible display, and are rotated respectively in the first body and the second body. A first lateral guiding rail is provided on one lateral surface of the curved body, a second lateral guiding rail is provided in a lateral surface of one end of the corresponding second body, and a third lateral guiding rail is provided on a lateral surface of one end of the corresponding first body. The second lateral guiding rail and the third lateral guiding rail are respectively connected with the first lateral guiding rail and are moved relatively with the first lateral guiding rail, so as to guide and limit the two support plates to rotate at a limited angle respectively, such that the first body and the second body are respectively rotated around a virtual rotation center to be unfolded or folded relative to the curved base body. When the foldable device is folded, a sufficient accommodating space is formed between the first support plate and the second support plate that are parallel for accommodating a bending portion of the flexible display.

The present invention will be understood more fully by reference to the detailed description of the drawings and the preferred embodiments below. In order to deeply understand the present invention, the embodiments of the present invention are described below.

DETAILED DESCRIPTIONS OF PREFERRED EMBODIMENTS

Figure 1:
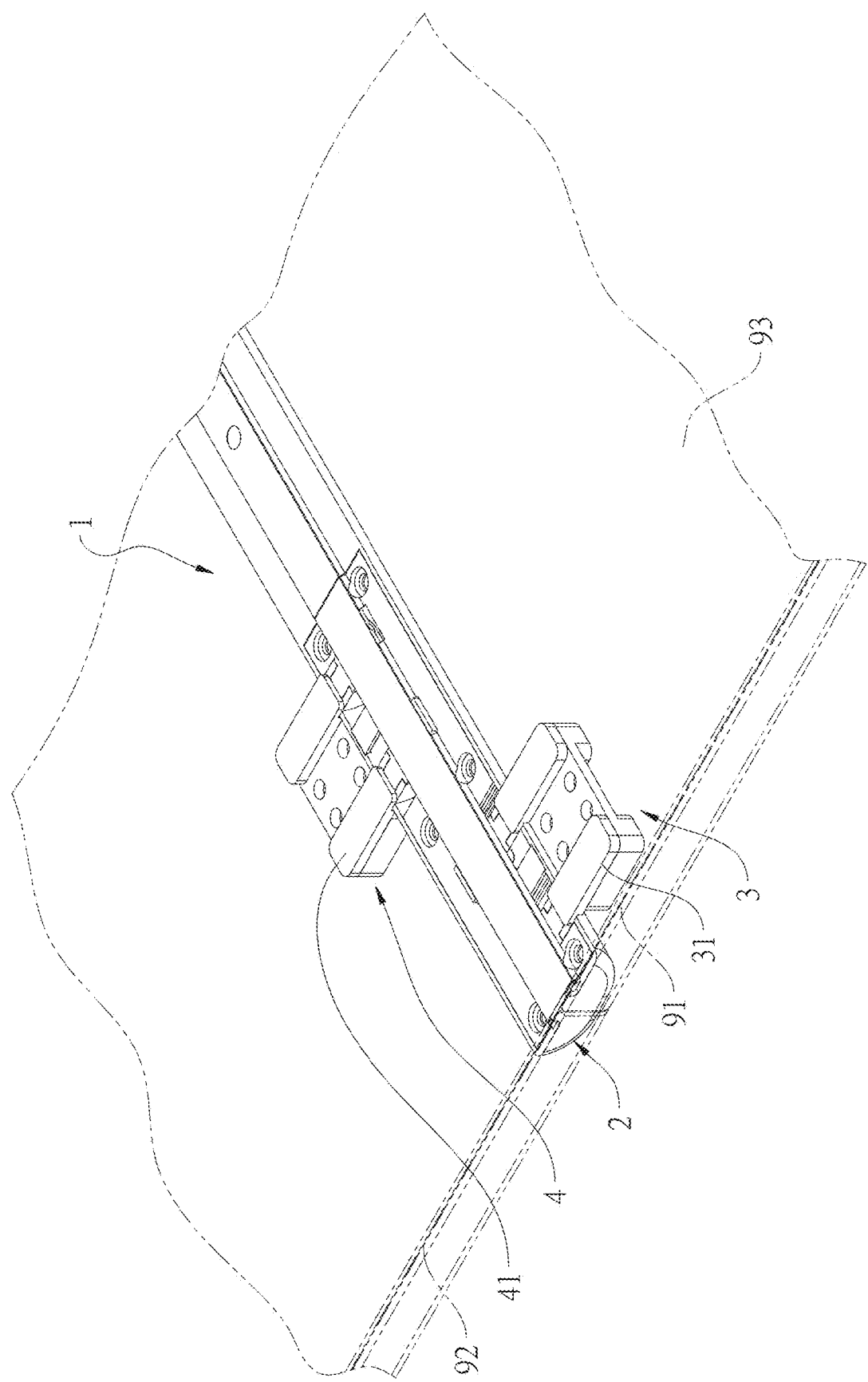
FIG. 1 is a schematic view of a three-dimensional appearance of a first embodiment of the present invention.
Figure 2:
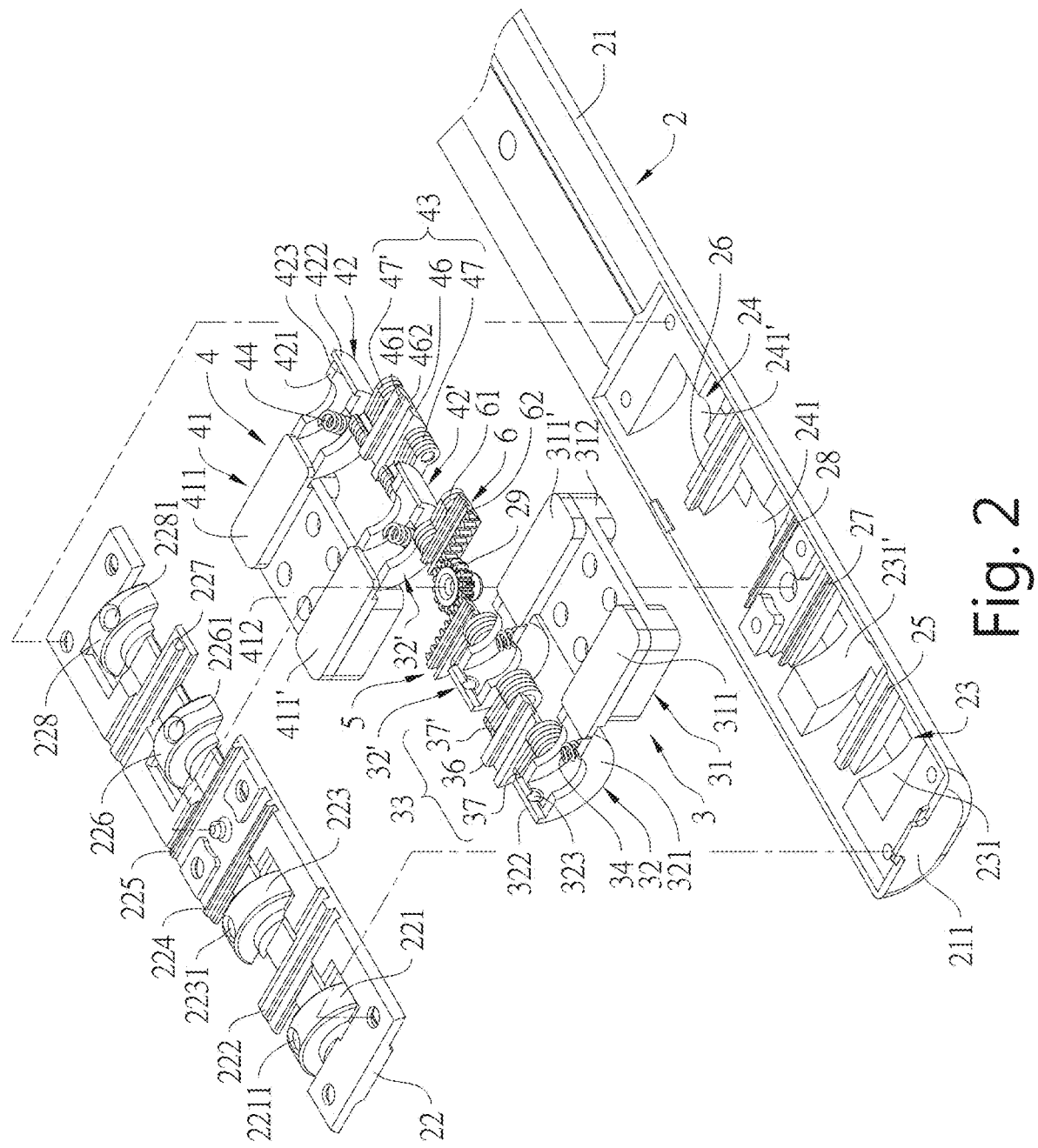
FIG. 2 is an exploded view of the components of the first embodiment of the present invention.
Figure 3:
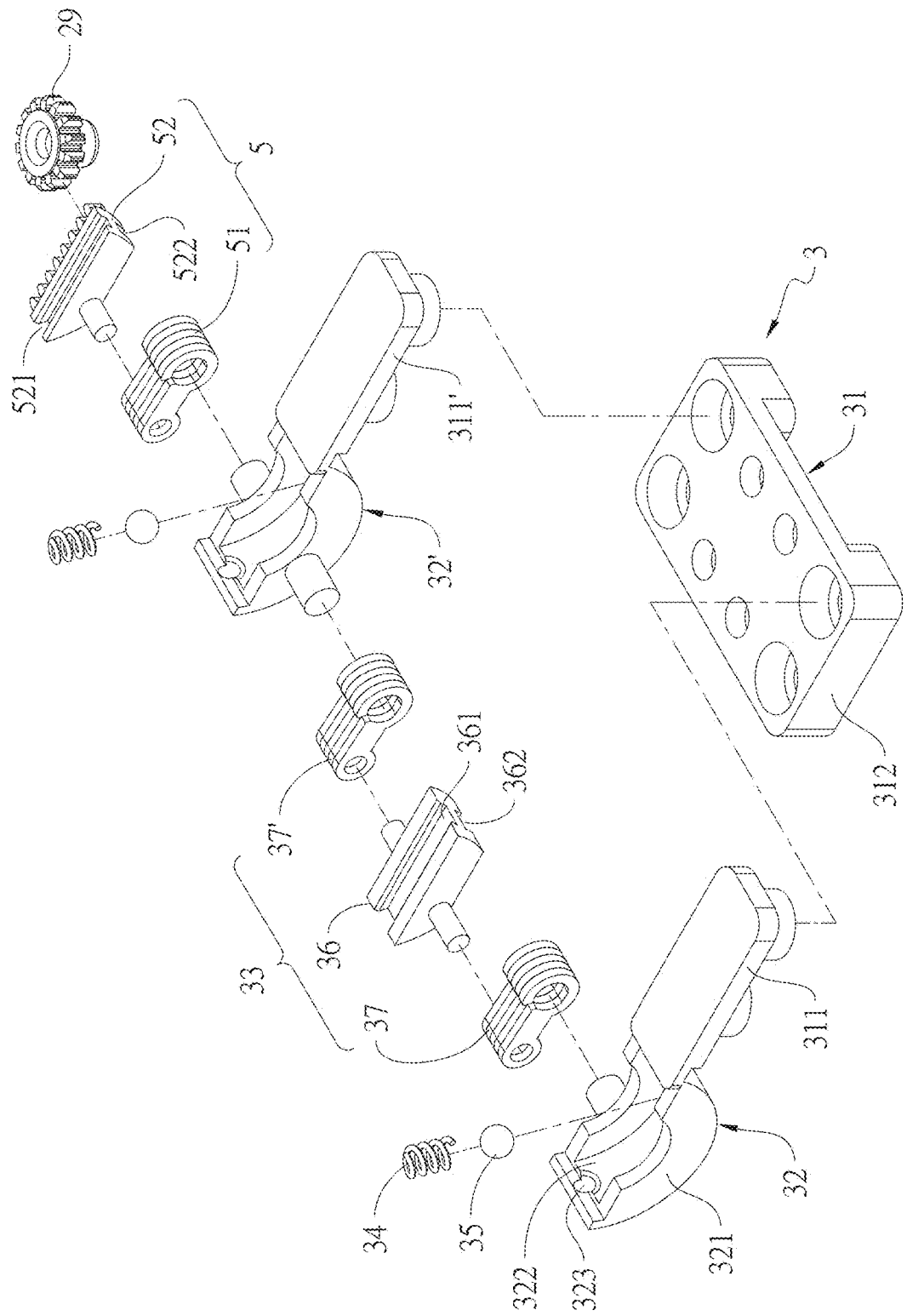
FIG. 3 is an exploded view of part of components of the first embodiment of the present invention.
Figure 4:
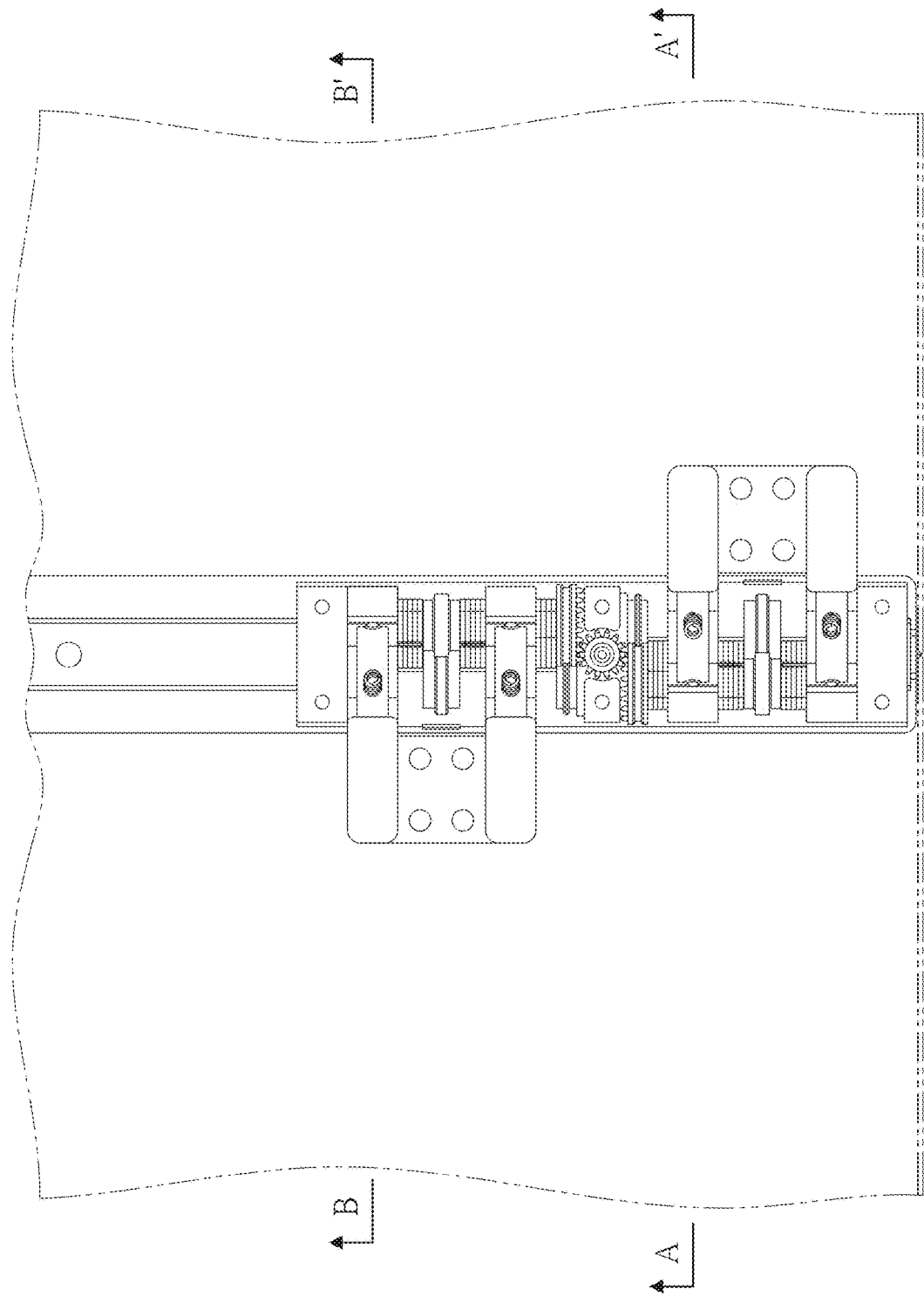
FIG. 4 is a top view of a first embodiment of the present invention.
Figure 5:
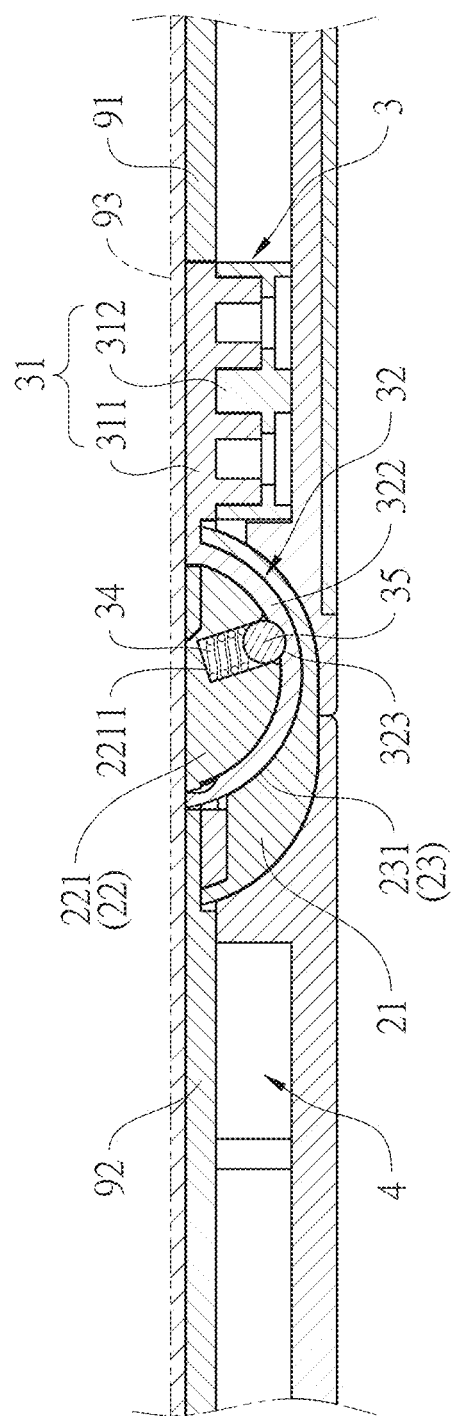
FIG. 5 is a sectional view taken along the line A-A' in FIG. 4.
Figure 6:
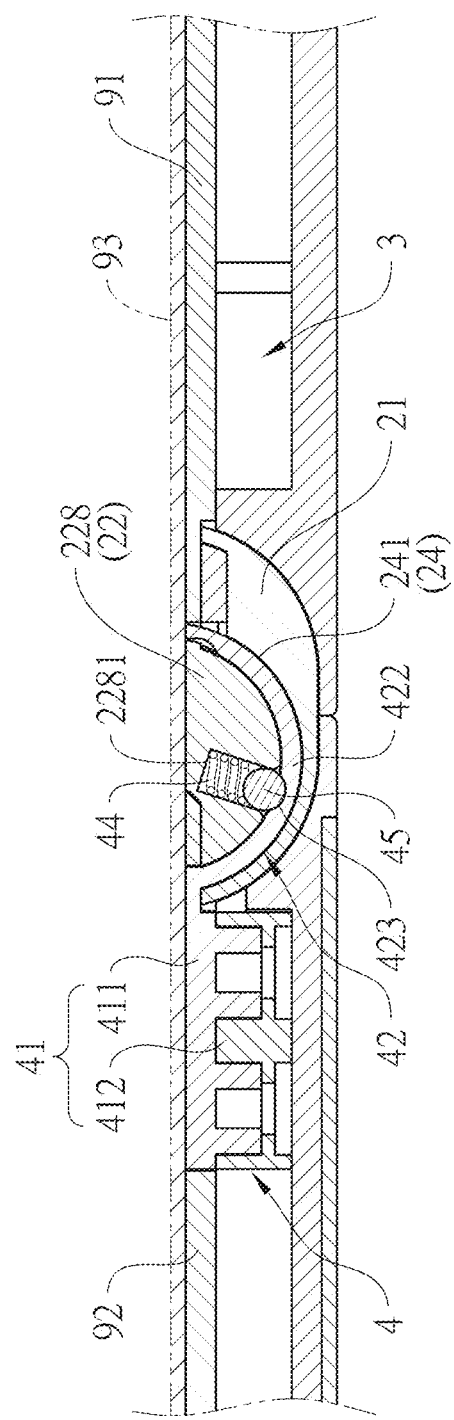
FIG. 6 is a sectional view taken along the line B-B' in FIG. 4.
Figure 7:
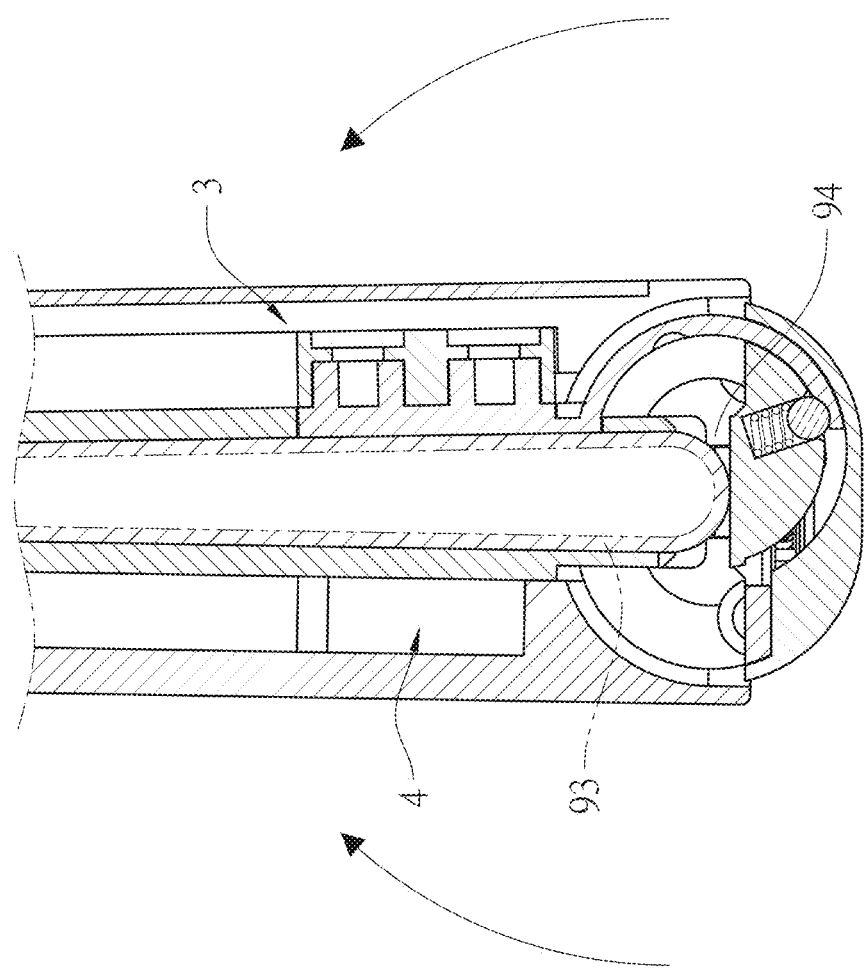
FIG. 7 is a schematic cross-sectional view of the first embodiment of the present invention when being folded.
Figure 8:
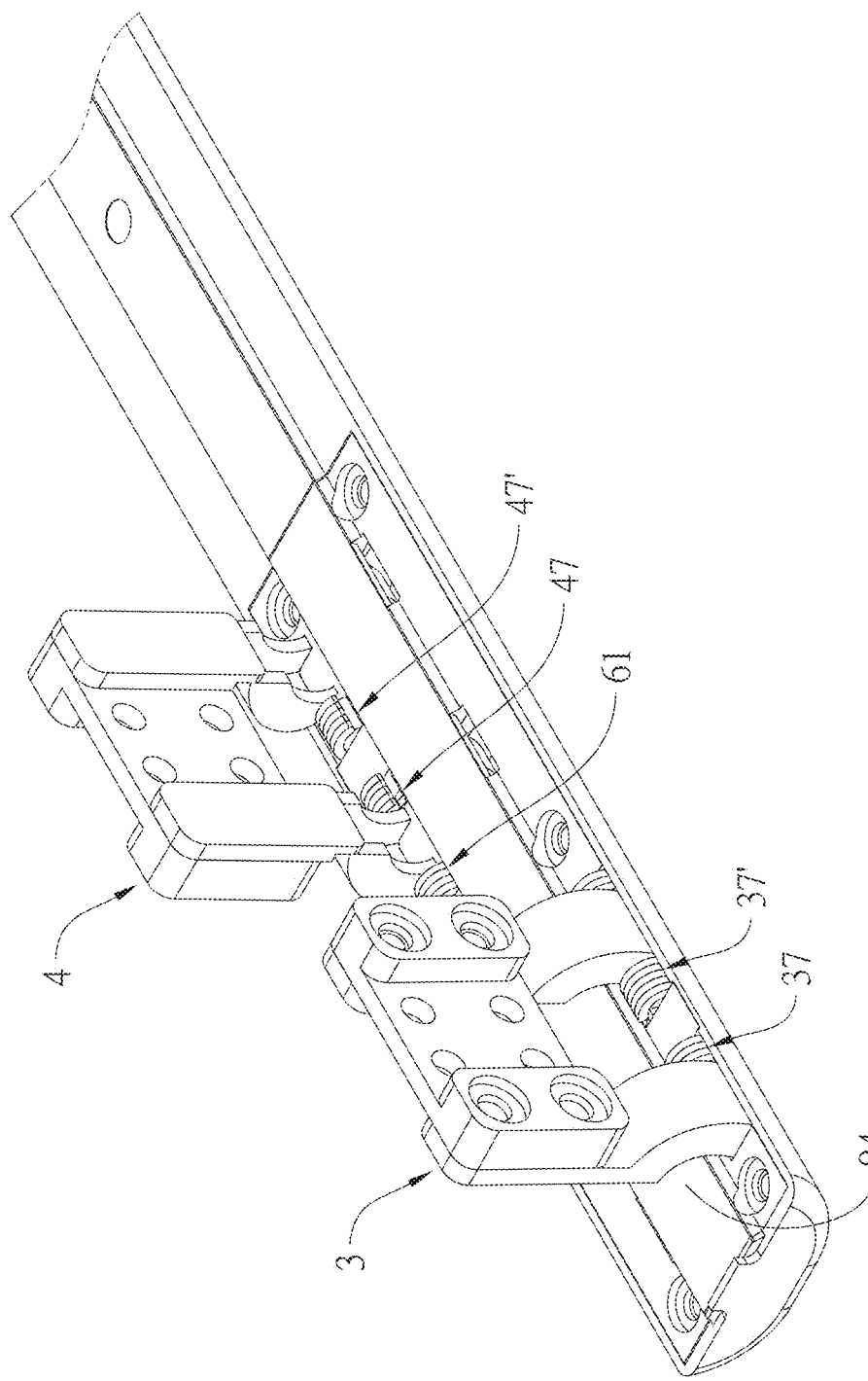
FIG. 8 is a schematic view of the three-dimensional appearance of the first embodiment of the present invention when being folded.
Figure 10:
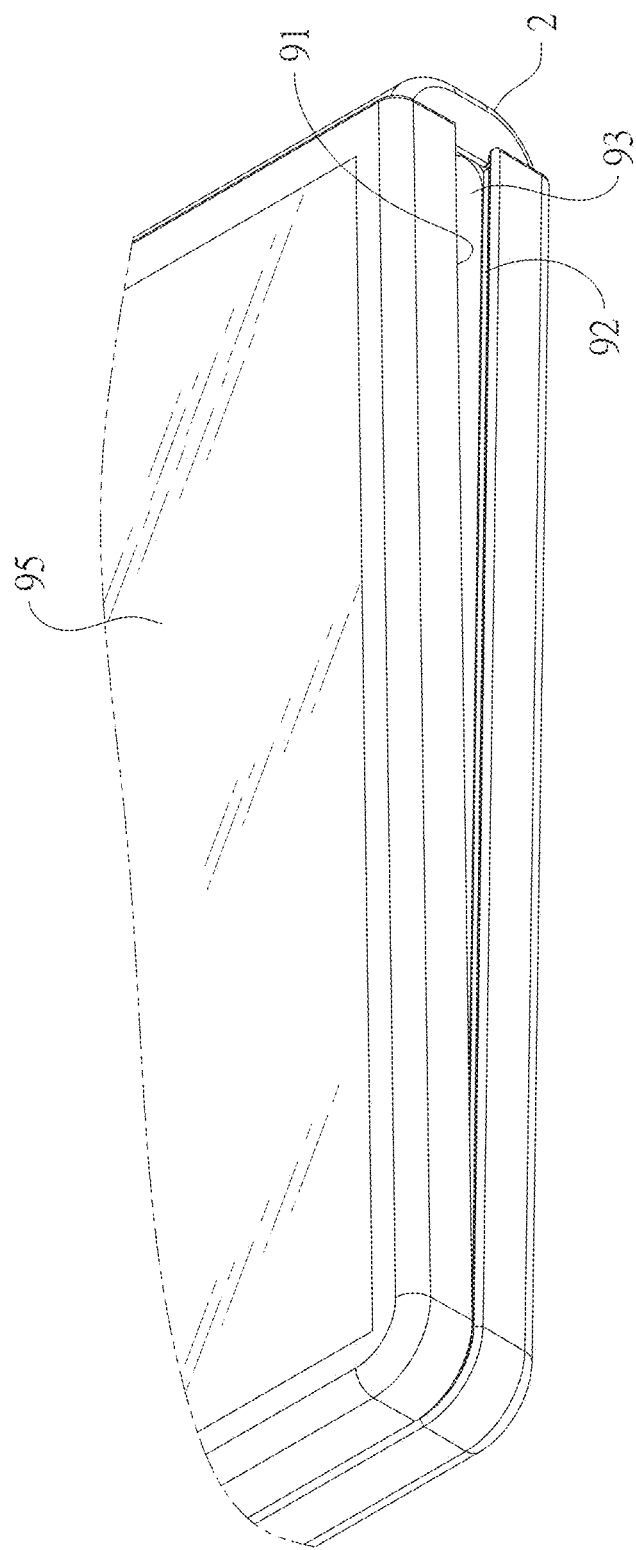
FIG. 10 is a schematic view of the appearance of the electronic device when it is folded according to a first embodiment of the present invention.
Figure 11:
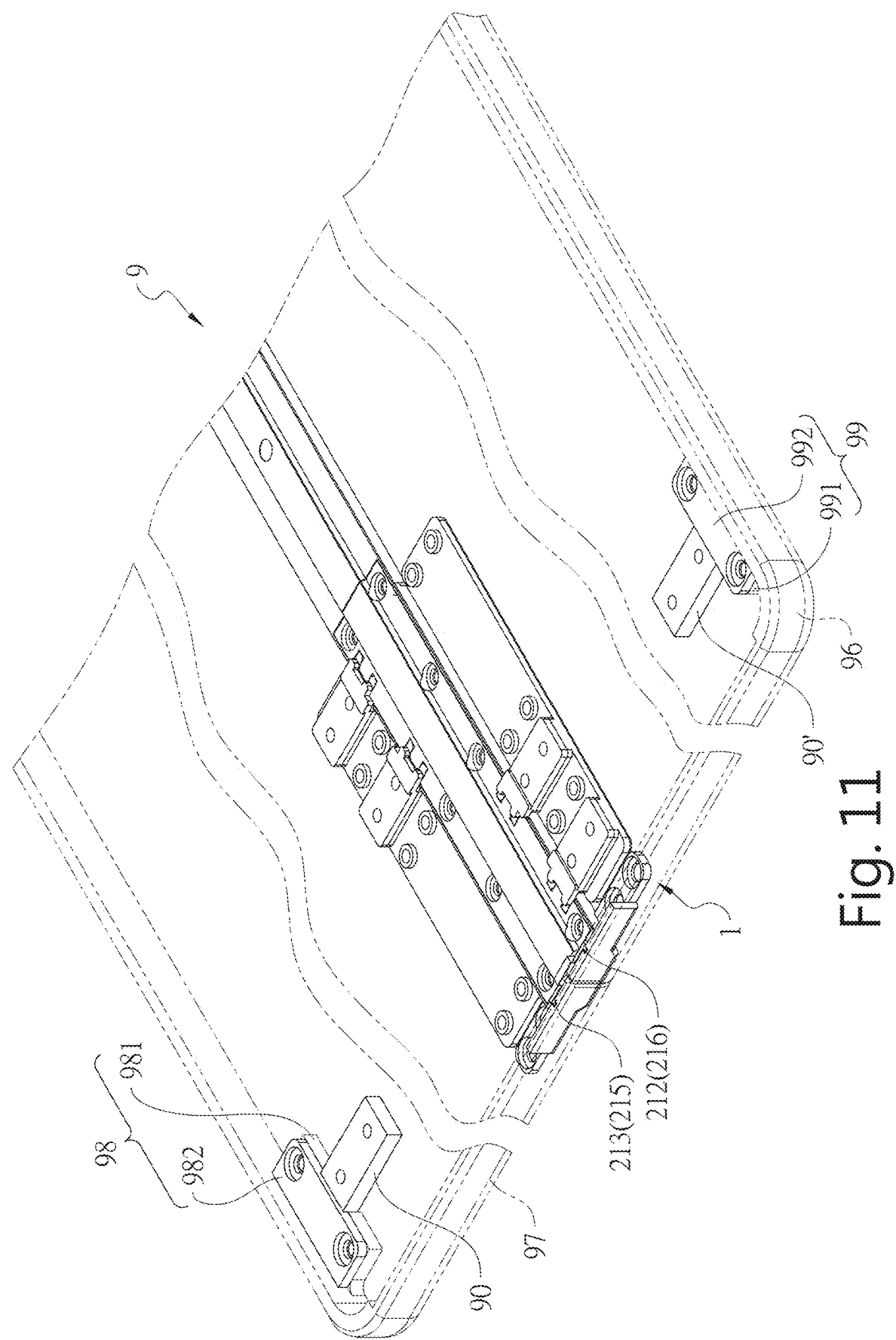
FIG. 11 is a schematic view of a three-dimensional appearance of a preferred second embodiment of the present invention.
Figure 12:
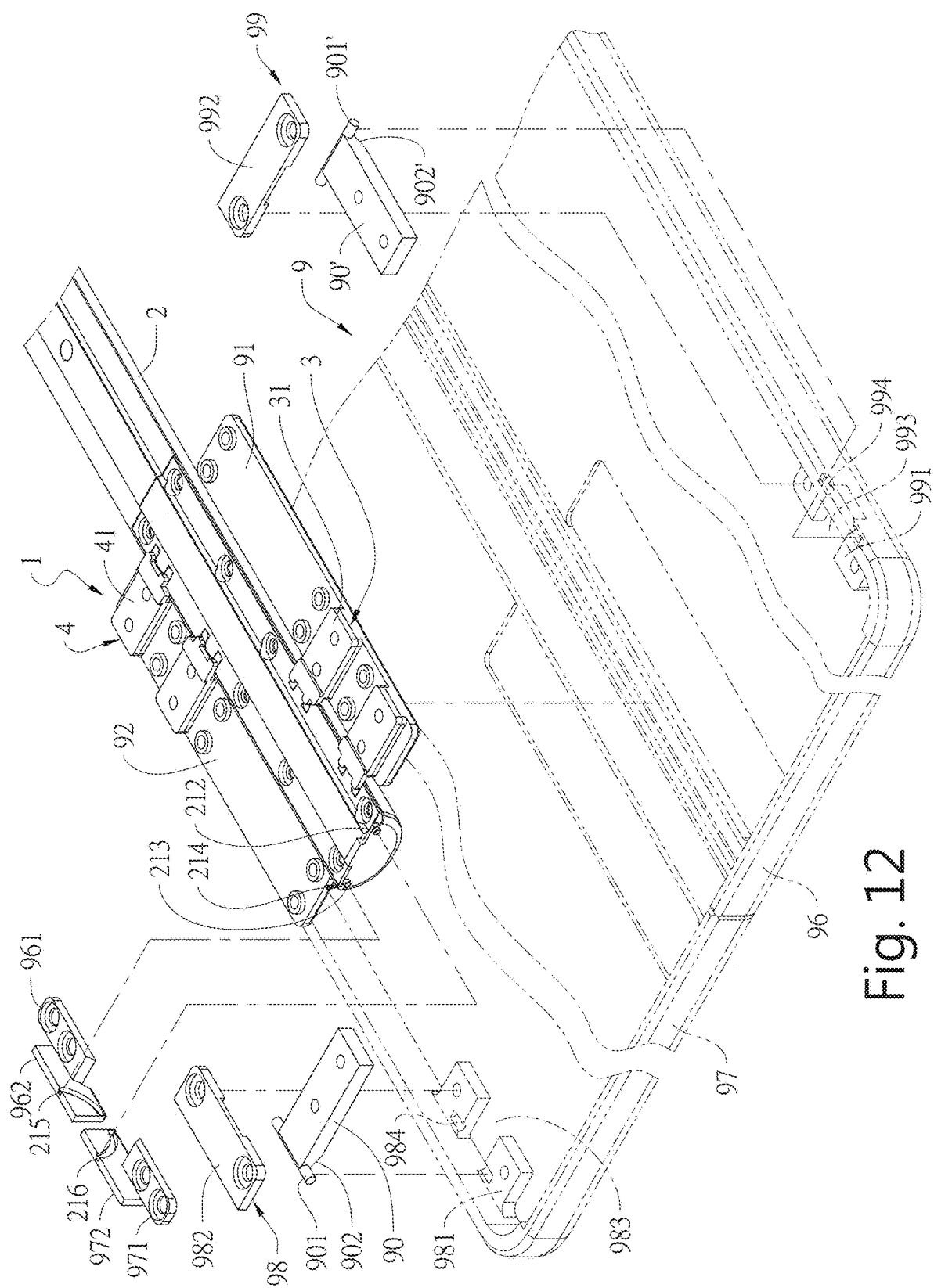
FIG. 12 is an exploded view of part of components of the second embodiment of the present invention.

Please refer to FIG. 1, which is a preferred embodiment of the hinge module 1 for a foldable device of the present invention. The first connecting portion 31 of the first rotating member 3 is connected with one side of a first support plate 91 of a body (for example, a display) of an electronic device. A second connecting portion 41 of a second rotating member 4 is connected with one side of a second support plate 92 of another body (for example, a base) of the electronic device; the first support plate 91 and the second support plate 92 are both connected with a flexible display 93, such that when the first rotating member 3 and the second rotating member 4 are respectively rotated around a curved body 2 as an axis, the two bodies (for example, the display and the base) is rotated in a reverse direction to fold the flexible display 93. As shown in FIG. 10, the outside of the body where the first support plate 91 is located can further be provided with a second display 95. When the entire structure is folded, the second display 95 can display information or perform touch operations. In addition, two touch displays can be respectively connected with the first support plate 91 and the second support plate 92 that are juxtaposed to replace the implement of the flexible display 93. Then, the first connecting portion 31 of the first rotating member 3 and the second connecting portion 41 of the second rotating member 4 are respectively connected with one side of two supporting plates that are juxtaposed, that is, the hinge module of the present invention can be applied to a foldable (electronic) device with a dual touch displays.

Please refer to FIG. 2 to FIG. 6, which are preferred embodiments of the hinge module 1 of the foldable device of the present invention including a curved body 2, a first rotating member 3, a second rotating member 4, a first linkage assembly 5, and a second linkage assembly 6.

The curved body 2 includes a curved base 21 and a cover plate 22. The curved base 21 has two opposite lateral surfaces 211, and the curved base 21 between the two lateral surfaces 211 is provided with a first curved guiding portion 23 and a second curved guiding portion 24 that are juxtaposed and spaced from each other. The first curved guiding portion 23 includes two first curved grooves (231, 231') that are juxtaposed and spaced from each other, and a first track 25 is provided between the two first curved grooves (231, 231'). The second curved guiding portion 24 includes two second curved grooves (241, 241') that are juxtaposed and spaced from each other. A second track 26 is provided between the two second curved grooves (241, 241'). A third track 27 and a fourth track 28 are further provided on the curved base 21 between the first curved guiding portion 23 and the second curved guiding portion 24, and a gear 29 is provided between the third track 27 and the fourth track 28. The cover plate 22 is covered and connected with the top surface of the curved base 21. A plate surface of the cover plate 22 sequentially has a first curved convex portion 221, a first upper track 222, a second curved convex portion 223, a third upper track 224, a fourth upper track 225, a third curved convex portion 226, a second upper track 227, and a fourth curved convex portion 228. The first curved convex portion 221, the second curved convex portion 223, the third curved convex portion 226 and the fourth curved convex portion 228 are respectively accommodated within the first curved groove (231, 231') and the second curved groove (241, 241'). The first upper track 222, the third upper track 224, the fourth upper track 225, and the second upper track 227 are respectively provided opposite to the first track 25, the third track 27, the fourth track 28, and the second track 26. The first curved convex portion 221 and the second curved convex portion 223 are respectively provided with a first accommodation space (2211, 2231), and the third curved convex portion 226 and the fourth curved convex portion 228 are respectively provided with a second accommodation space (2261, 2281).

The first rotating member 3 includes a first connecting portion 31, two first curved blocks (32, 32'), and a first linkage assembly 33. The first connecting portion 31 includes two first support rods (311, 311') and a first connecting plate 312 respectively connected with one end of each first support rod (311,311'). The first connecting plate 312 is connected with a side of the first support plate 91 of the body (the display) of an electronic device, and another end of each first support rod (311, 311') is respectively extended to form two first curved blocks (32, 32') that are in parallel and juxtaposed. Taking a first curved block 32 as an example, the first curved block 32 is a curved frame, including two first lateral plates 321 and a first curved plate 322 respectively connected with the two first lateral plates 321. Two first positioning grooves 323 are provided on the inner curved surface of the first curved plate 322. When the first curved block 32 is swingable and limited within the first curved guiding portion 23, a compression spring is accommodated in a first accommodation space 2211 of the first curved convex portion 221. The compression spring is used as a first elastic member 34. The first elastic member 34 has one end pressed against a first positioning ball 35, and the first positioning ball 35 is pressed against the inner curved surface of the first curved plate 322, and the first rotating member 3 is positioned in any of the first positioning grooves 323 at a preset angle by the first positioning ball 35.

The first linkage assembly 33 is connected between the two first curved blocks (32, 32'). The first linkage assembly 33 includes a first sliding block 36 and two first torsion bars (37 37'), and a first upper straight groove 361 and a first lower straight groove 362 are respectively formed on a top surface and a bottom surface of the first sliding block 36, and the first upper straight groove 361 and the first lower straight groove 362 respectively accommodate and limit the first upper track 222 of the cover plate 22 and the first track 25 of the curved base 21. Two first torsion bars (37, 37') are formed by respectively stacking a plurality of torsion pieces, and one end of each first torsion bar (37, 37') is pivotally connected with one side of one first curved block (32, 32'), and another end of each first torsion bar (37, 37') are respectively pivotally connected with both sides of the first sliding block 36, such that when the first rotating member 3 is rotated, the first sliding block 36 is driven by the linkage of the two first torsion bars (37, 37') to be moved on the first upper track 222 and the first track 25.

The second rotating member 4 includes a second connecting portion 41, two second curved blocks (42, 42'), and a second linkage assembly 43. The second connecting portion 41 includes two second support bars (411,411') and a second connecting plate 412 respectively connected with one end of each two second support bars (411,411'). The second connecting plate 412 is connected with a side of the second support plate 92 of another body (another display or base) of the electronic device, and another end of each second support rod (411, 411') is respectively extended to form two second curved blocks (42, 42') that are in parallel and juxtaposed. Take a second curved block 42 as an example. The second curved block 42 is a curved frame including two second lateral plates 421 and a second curved plate 422 respectively connected with the two second lateral plates 421. Two second positioning grooves 423 are provided on the inner curved surface of the second curved plate 422. When the second curved block 42 is swingable and limited within the second curved guiding portion 24, a compression spring is accommodated in a second accommodation space 2291 of the fourth curved convex portion 228. The compression spring is used as a second elastic member 44. One end of the second elastic member 44 is pressed against a second positioning ball 45, and the second positioning ball 45 is pressed against the inner curved surface of the second curved plate 422 and the second rotating member 4 is positioned in any one of the second positioning grooves 423 at a preset angle by the second positioning ball 45.

The second linkage assembly 43 is connected between two second curved blocks (42, 42'). The second linkage assembly 43 includes a second sliding block 46 and two second torsion bars (47 47'). The top and bottom surfaces of the second sliding block 46 respectively form a second upper straight groove 461 and a second lower straight groove 462, and the second upper straight groove 461 and the second lower straight groove 462 respectively accommodate and limit the second upper track 227 of the cover plate 22 and the second track 26 of the curved base 21. The two second torsion bars (47,47') are formed by respectively stacking a plurality of torsion pieces, and one end of each second torsion bar (47,47') is pivotally connected with one side of one second curved block (42, 42'), and each second torsion bar (47, 47') has another end respectively pivotally connected to both sides of the second sliding block 46, such that when the second rotating member 4 is rotated reverse to the first rotating member 3, the second sliding block 46 is moved on the second upper track 227 and the second track 26 through the linkage of the two second torsion bars (47, 47').

The first linkage assembly 5 includes a first torsion member 51 and a first linkage member 52. The first torsion member 51 is formed by stacking a plurality of torque pieces, and one end of the first torsion member 51 is pivotally connected with a side of the first curved block 32' of the rotating member 3, and another end of the first torsion member 51 is pivotally connected with the first linkage member 52. The first linkage member 52 is a rack. The top and bottom surfaces of the first linkage member 52 respectively form a first upper guiding rail 521 and a first guiding rail 522. The first upper guiding rail 521 and the first guiding rail 522 respectively accommodate and limit the third upper track 224 of the cover plate 22 and the third track 27 of the curved base 21. One side of the first linkage member 52 is engaged with one side of the toothed gear 29.

The structure of the second linkage assembly 6 is the same as that of the first linkage assembly 5, and the second linkage assembly 6 and the first linkage assembly 5 are symmetrical corresponding to both sides of the toothed gear 29 in the reverse direction. One end of the second torsion member 61 of the second linkage assembly 6 is pivotally connected with one side of the second curved block 42' of the second rotating member 4, and another end of the second torsion member 61 is pivotally connected with the second linkage member 62. The second linkage member 62 can be slid on the fourth upper track 225 of the cover plate 22 and the fourth track 28 of the curved base 21 by the second upper track 621 and the second guiding rail 622, and a toothed portion on one side of second linkage member 62 is engaged with another side of the toothed gear 29.

With such arrangement, as shown in FIGS. 2, 3, 7, and 8, in the process in which the two support plates (that is, the display relative to the base or the touch display relative to the other touch display) are folded or unfolded, when the second rotating member 4 is rotated relative to the first rotating member 3, the first linkage member 52 and the second linkage member 62 are driven through the linkage of the first torsion member 51 and the second torsion member 61 to have the first linkage member 52 and the second linkage member 62 respectively moved in a reverse direction on the third track 27 and the fourth track 28 with the gear 29 as a rotation axis. By the torque generated by the rotational friction generated and operated together by the two first torsion bars (37, 37'), the two second torsion bars (47, 47'), a first torsion piece 51 and a second torsion piece 61, such arrangement can make the torque keep stable within the preset range at each rotation angle, and then enable the two juxtaposed support plates that is combined with the display and the base or the dual touch display to be rotated stably, and can stop freely at certain angle when two support plates are rotated. When the two juxtaposed supporting plates are folded, a sufficient accommodating space 94 can be formed for accommodating the curved portion of the flexible display 93 with a small curvature.

Figure 9:
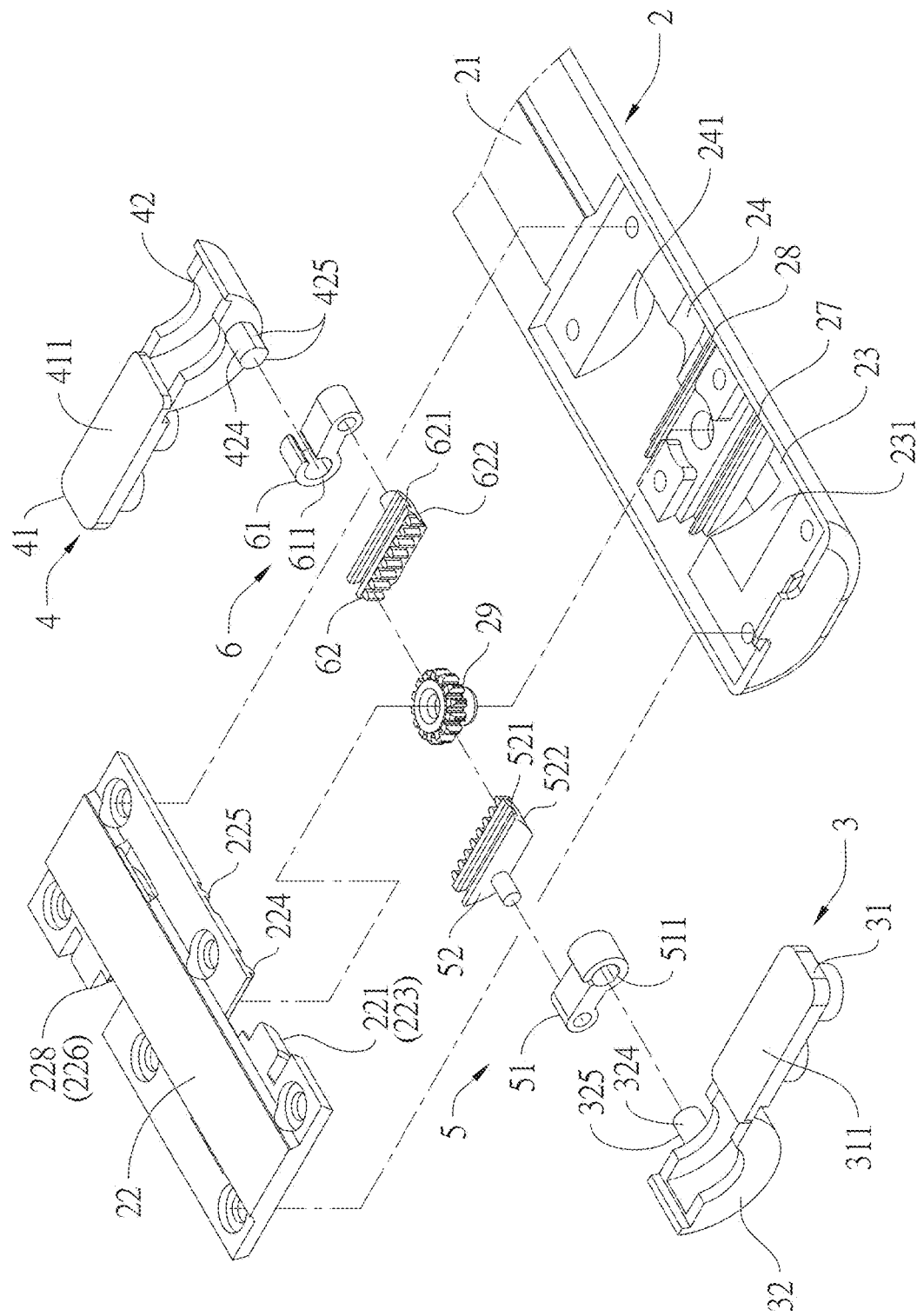
FIG. 9 is an exploded view of a simplified embodiment of the present invention.

In addition, the hinge module of the present invention can further simplify the components to reduce the process and reduce the cost. The simplified embodiment is shown in FIG. 9, in which for the curved base 21 of the curved body 2, in addition to retaining the gear 29, the third track 27 and the fourth track 28, the first curved guiding portion 23 is provided with a curved groove 231, and the second curved guiding portion 24 is provided with a second curved groove 241, and a first curved convex part 221 (or a second curved convex part 223), a third upper track 224, a fourth upper track 225, and a fourth curved convex portion 228 (or a third curved convex portion 226) are sequentially provided on the plate surface of the cover plate 22 of the curved body 2. The first rotating member 3 includes a first support rod 311 of a first connecting portion 31 and a first curved block 32. The first curved block 32 is provided between the first curved convex portion 221 (or the second curved convex portion 223) and a first curved groove 231 to carry out a relatively curved swing. The second rotating member 4 includes a second support rod 411 of a second connecting portion 41 and a second curved block 42, and the second curved block 42 is provided between the fourth curved convex portion 228 (or the third curved convex portion 226) and the second curved groove 241 to carry out a relatively curved swing. The first linkage assembly 5 includes a first torsion member 51 integrally manufactured and a first linkage member 52 used as a rack. The first torsion member 51 has opposite ends pivotally connected with the first curved block 32 and the first linkage member 52 respectively. The first linkage member 52 is engaged with one side of the gear 29, and the third upper track 224 and the third track 27 are respectively accommodated and limited with the first upper track 521 and the first track 522. The second linkage assembly 6 includes a second torsion member 61 that is integrally manufactured and a second linkage member 62 used as a rack. The second torsion member 61 has opposite ends pivotally connected to the second curved block 42 and the second linkage member 62 respectively. The second linkage member 62 is engaged with another side of the gear 29, and the fourth upper track 225 and the fourth track 28 are respectively accommodated and limited with the second upper track 621 and the second track 622.

In the simplified embodiment described above, the first rotating member 3 and the second rotating member 4 as the main rotating elements both have torque and positioning effects, so that they are provided with a first lateral convex shaft 324 and a second lateral convex shaft 424 on one side of the first curved block 32 and one side of the second curved block 42. However, the axial centers of the two lateral convex shafts are not virtual rotation centers of the respective rotating members, and at least one outer plane (325,425) is formed on the peripheries of the first lateral convex shaft 324 and the second lateral convex shaft 424. One end of the first torsion member 51 and one end of the second torsion member 61 are respectively connected pivotally with the first lateral convex shaft 324 and the second lateral convex shaft 424 by a pivot shaft hole, and the inner wall of each pivot shaft hole has an inner plane (511,611), so that each of the inner plane (511,611) correspondingly engages one of the at least one outer plane (325,425) to position each rotating member, and at one end of the first torsion member 51 and one end of the second torsion member 61 are respectively provided with radial opening pivoting shaft holes that are in communication with each other, such that each lateral convex shaft carries out forward and reverse rotation friction in each pivoting shaft hole, thereby producing technical effect of easy opening and heavy closing. The foregoing technical means can also be applied between each rotating member and the torsion bars of each linkage assembly of the preferred embodiments. Since the structures are the same, they will not be described here.

Please refer to FIGS. 11-20, the difference between the second embodiment of the present invention and the first embodiment is that two protruding columns (212,213) are provided outside of a lateral surface the curved base 2. The two protruding columns (212,213) are used as the first lateral guiding rails 214. The corresponding second body 97 has an curved groove in a lateral surface of one end, and the curved groove is used as the second lateral guiding rail 215, and has another curved groove in a lateral surface of one end of the corresponding first body 96, and the another curved groove is used as the third lateral guiding rail 216, and the second lateral guiding rail 215 is connected with one protruding column 213 of the first lateral guiding rail 214 and is relatively movable, so as to be guided and limited to each other. The third lateral guiding rail 216 is connected with another protruding column 212 of the first lateral guiding rail 214 to be relatively moved, so as to be guided and limited to each other. In this way, when the first rotating member 3 and the second rotating member 4 are respectively rotated relative to the curved base 2 around a virtual rotation center, the two bodies are relatively rotated on a predetermined rotation path to fold or unfold the flexible display 93. Most preferably, the first lateral guiding rails 214 are provided on opposite lateral surfaces of the curved base 2, and a second lateral guiding rails 215 are provided on opposite lateral surfaces of one end of the corresponding second body 97, and the third lateral guiding rails 216 are respectively provided on the opposite lateral surfaces of one end of corresponding first body 96, such that each second lateral guiding rail 215 is correspondingly connected with one protruding column 213 of each first lateral guiding rail 214 and is limited to each other. Each third lateral guiding rail 216 is correspondingly connected with another protruding column 212 of each first lateral guiding rail 214 and is guided and limited with each other, such that the two bodies are relatively rotated on a predetermined rotation path so as to be more stable.

One end of the second body 97 is connected with one end of the curved base 2, and another end of the second body 97 is provided with a first fixing member 98 and a first connection member 90. The first fixing member 98 includes a base 981 and an upper cover 982. A gap 983 is formed in the middle of the base 981. When the upper cover 982 is covered over the base 981, the first fixing member 98 is respectively recessed to form a pivoting hole 984 on opposite sides of the gap 983. The first connecting member 90 is a rectangular plate body, one end of which has a pivoting shaft 901 and an inclined surface 902 extending from the pivoting shaft 901 toward the bottom surface of the first connecting member 90. The first connecting member 90 is locked and connected with another end of the second supporting plate 92, and one end of the second supporting plate 92 is pressed against one end of the curved base 2 to be aligned with the top surface of the curved base 2 for being connected with the second connecting portion 41 of the second rotating member 4. At least one rail structure member 961 is detachably locked onto the bottom surface of one end in the second body 97, and an extension piece 962 is bent and extended from one end of the at least one rail structure member 961 to be embedded into an end lateral surface of the adjacent second body 97. One end of the first connecting member 90 is pivotally connected to the two pivoting holes 984 of the first fixing member 98 by two opposite shaft ends of the pivoting shaft 901, such that one end of the first connecting member 90 is pivotally connected with the first fixing member 98 to have another end of the second body 97 pivotally connected with another end of the second supporting plate 92, and to have the second lateral guiding rail 215 provided on the surface of the extension piece 962 to be guided and limited with one protruding column 213 of the first lateral guiding rail 214. In this way, when the two bodies are rotated in a reverse direction, the second supporting plate 92 is rotated in the second body 97 with a limited angle, so that one half of the bent flexible display 93 can be smoothly unfolded.

One end of the first body 96 is connected with another end of the curved base 2. Another end of the first body 96 is provided with a second fixing member 99 and a second connecting member 90'. The second fixing member 99 has the same structure as the first fixing member 98 and also includes a base 991 and an upper cover 992, and a gap 993 is formed in the middle of the base 991 of the second fixing member 99. When the upper cover 992 of the second fixing member 99 is covered above the base 991, the second fixing member 99 is also recessed to form a pivoting hole 994 on opposite sides of the gap 993. The second connecting member 90' is also a rectangular plate body, one end of which has a pivoting shaft 901' and a inclined surface 902' extending from the pivoting shaft 901' toward the bottom surface of the second connecting member 90', and the second connecting member 90' is locked on and connected with another end of the first support plate 91. One end of the first supporting plate 91 is pressed against another end of the curved base 2 to be aligned with the top surface of the curved base 2 for being connected with the first connecting portion 31 of the first rotating member 3. At least one rail structure member 971 is detachably locked onto and connected with the end bottom surface in the first body 96, and one end of the at least one rail structure member 971 is bent to extend an extension piece 972 for be embedded into a lateral surface of one end of the adjacent first body 96. One end of the second connecting member 90' is pivotally connected with the two pivoting holes 994 of the second fixing member 99 through opposite two shaft ends of the pivoting shaft 901' respectively, such that one end of the second connecting member 90' is pivotally connected with the second fixing member 99, such that another end of the first body 96 is pivotally connected with another end of the first support plate 91. In this way, the third lateral guiding rail 216 is provided on the surface of the extension piece 972 to be guided and limited with another protruding column 212 of the first lateral guiding rail 214, such that the first supporting plate 91 can be rotated at a limited angle in the first body 96, thereby the other half of the bent flexible display 93 can be smoothly unfolded.

Figure 13:
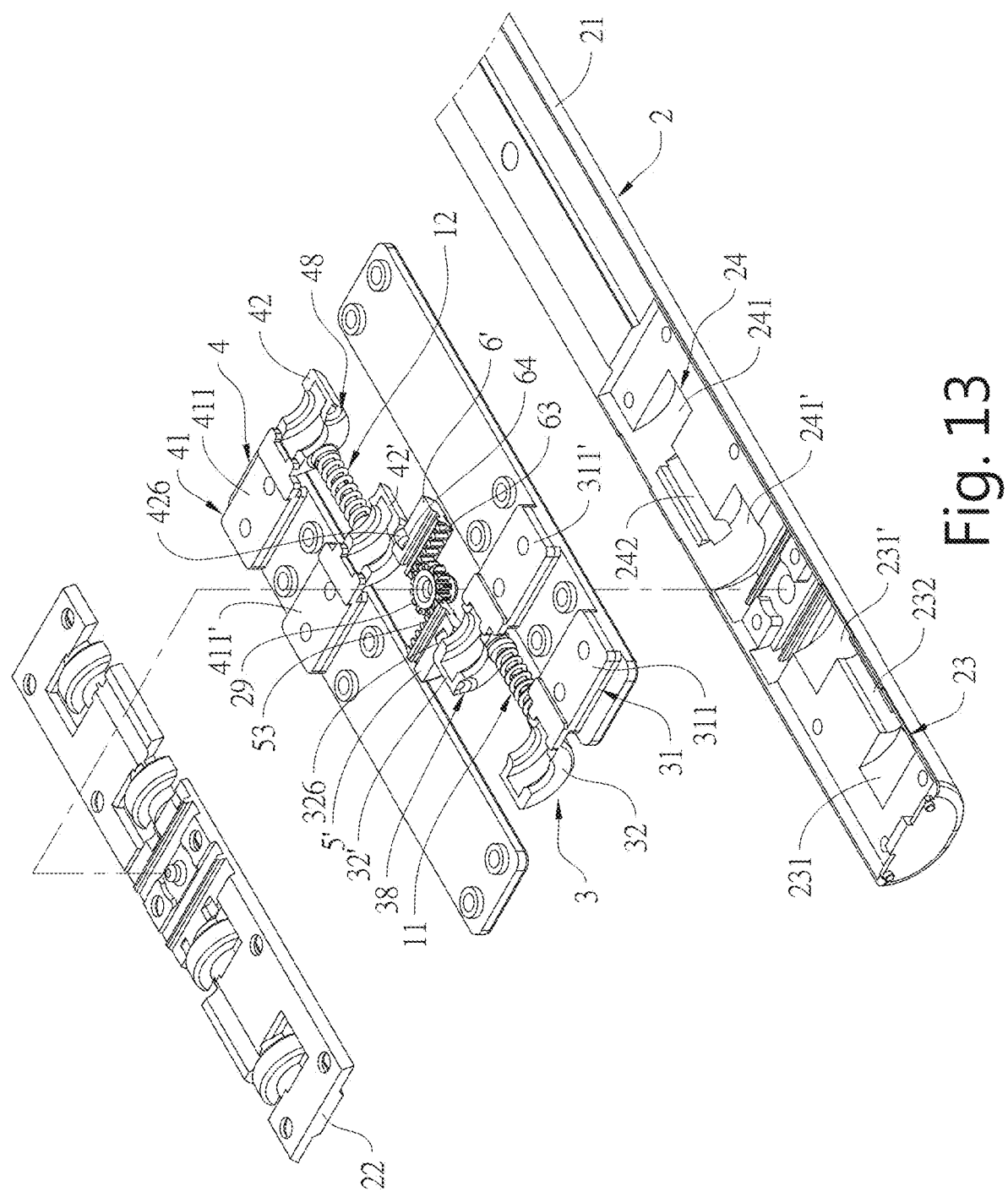
FIG. 13 is an exploded view of the components of the second embodiment of the present invention.
Figure 14:
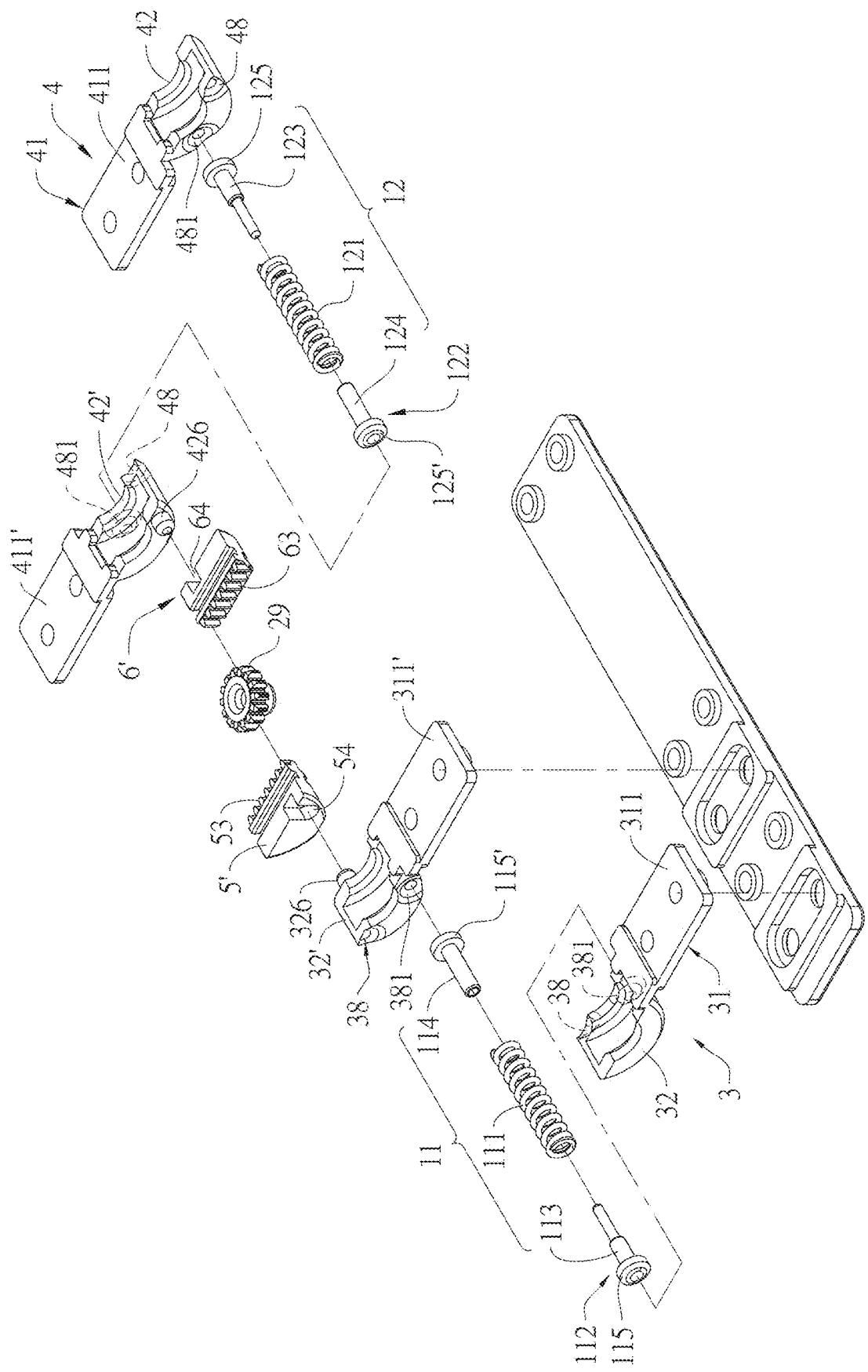
FIG. 14 is an exploded view of part of components of the second embodiment of the present invention.
Figure 15:
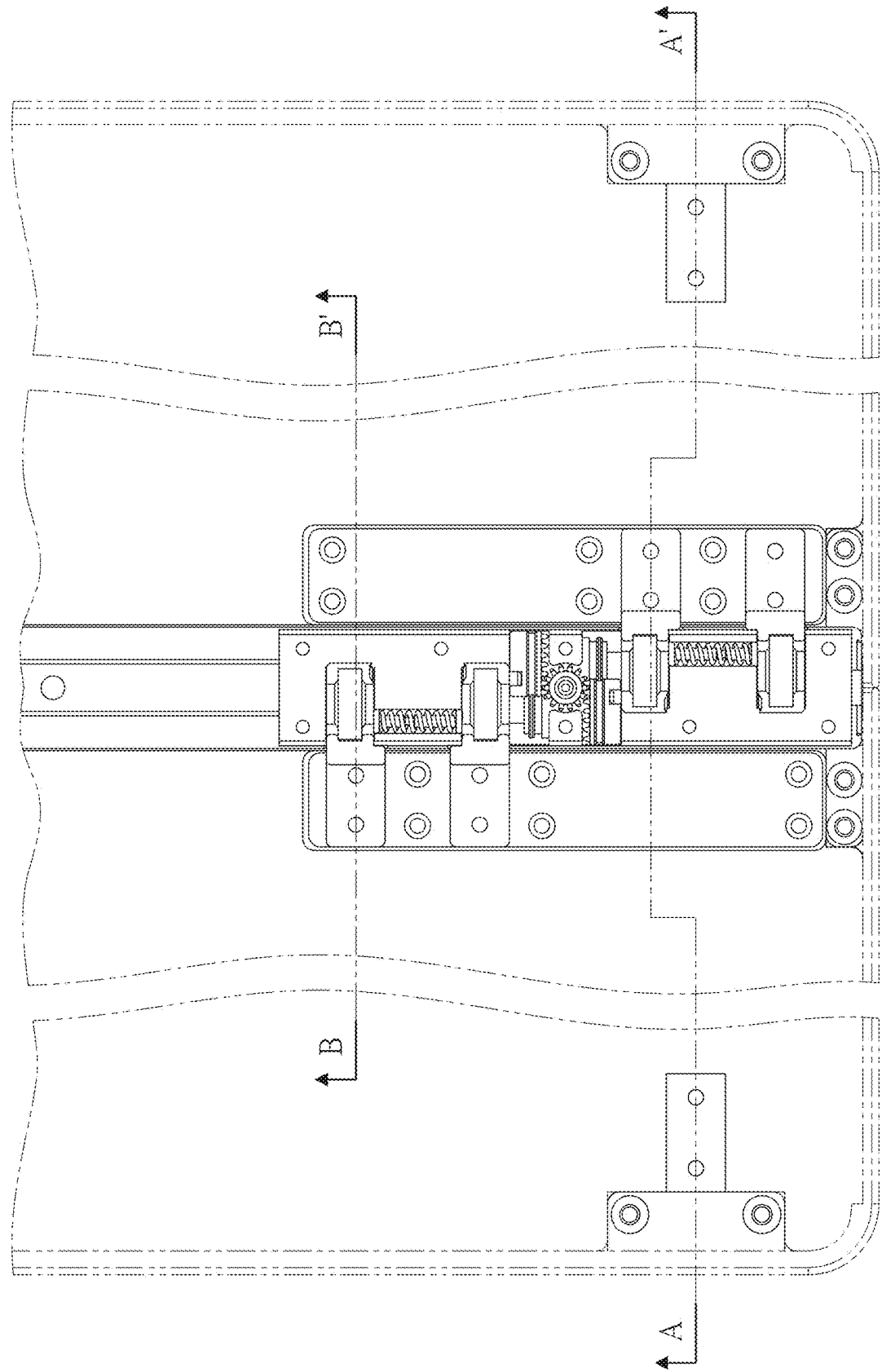
FIG. 15 is a top view of a second embodiment of the present invention.
Figure 16:
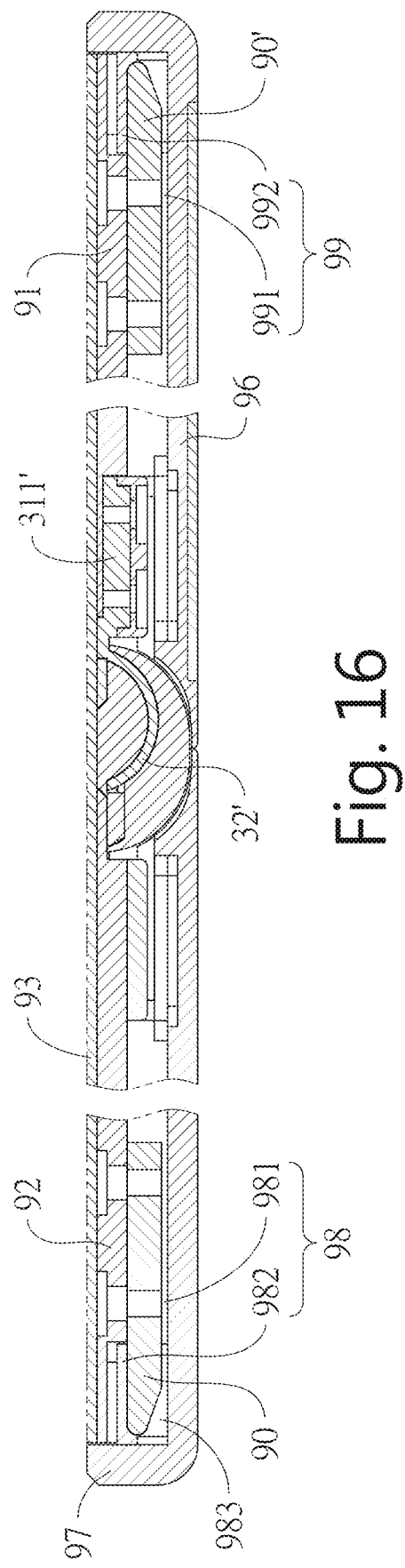
FIG. 16 is a sectional view taken along the line A-A' in FIG. 15.
Figure 17:
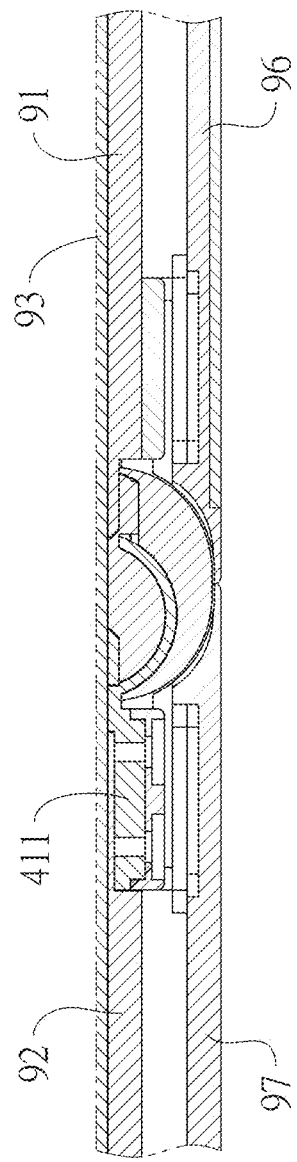
FIG. 17 is a sectional view taken along the line B-B' in FIG. 15.
Figure 18:
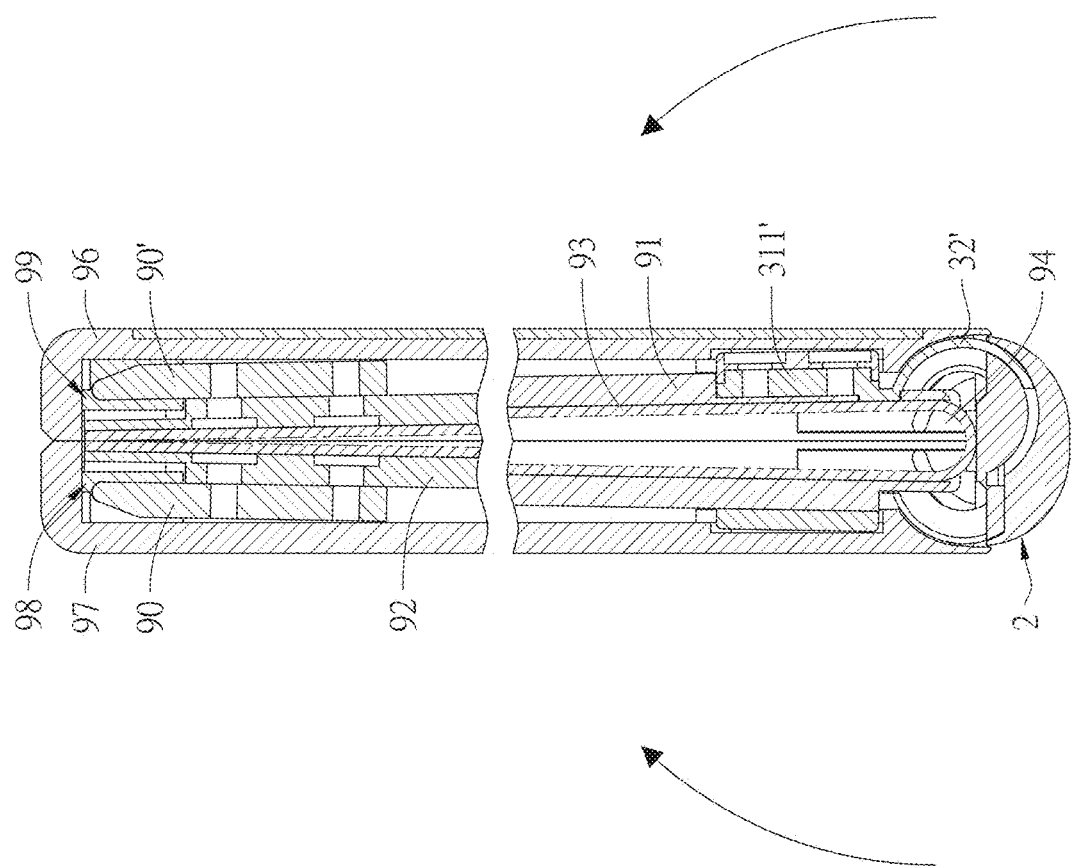
FIG. 18 is a schematic cross-sectional view of the second embodiment of the present invention when being folded.
Figure 19:
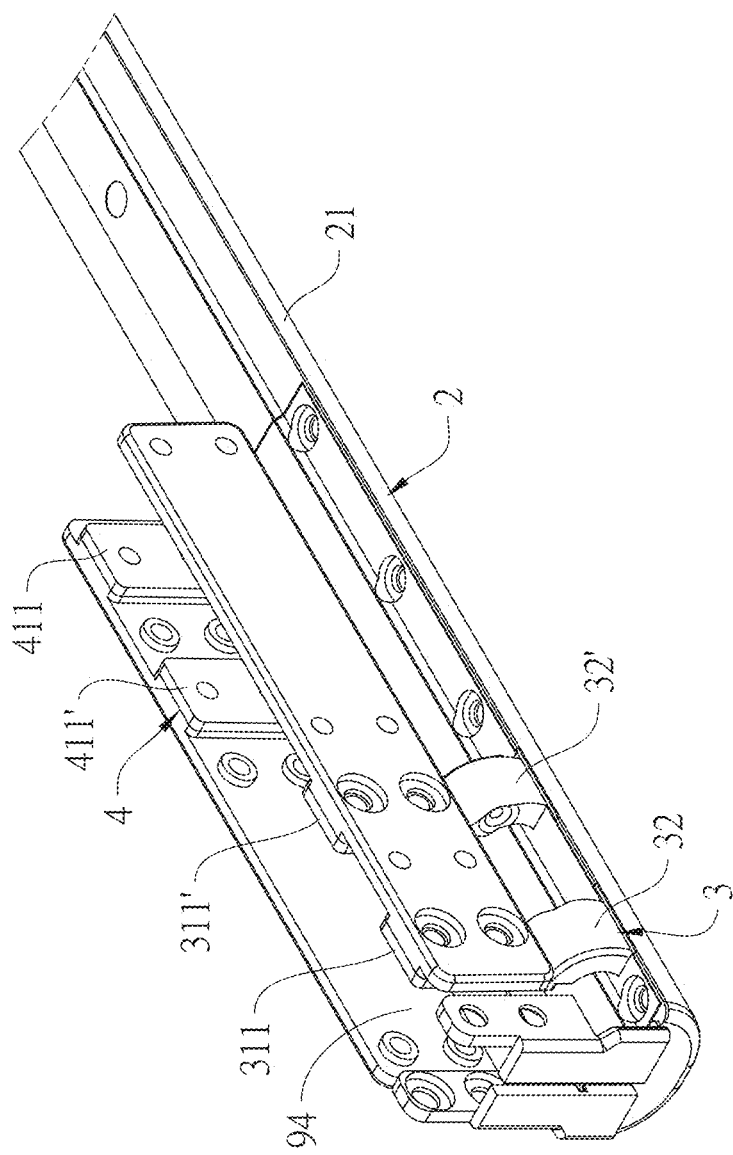
FIG. 19 is a schematic view of the three-dimensional appearance of the second embodiment of the present invention when being folded.
Figure 20:
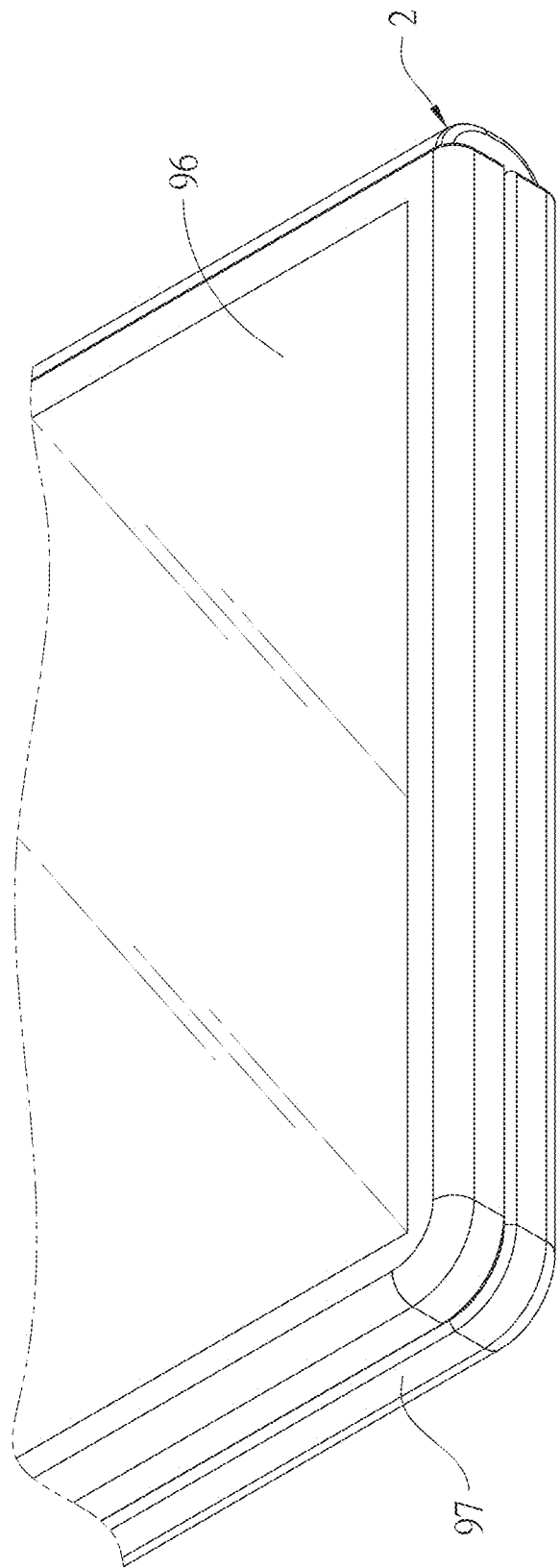
FIG. 20 is a schematic view of the three-dimensional appearance of the second embodiment of the present invention when being folded.

Please refer to FIG. 13 and FIG. 14, in the curved base 2, a first positioning groove 232 is provided between the two first curved grooves (231, 231'), and the two ends of the first positioning groove 232 are respectively in communication with the two first curved groove (231, 231') for positioning a first telescopic element 11. In one embodiment, the first telescopic element 11 includes a first compression spring 111 and a first telescopic sleeve 112, and the first compression spring 111 is sleeved with the first telescopic sleeve 112, and the first telescopic sleeve 112 is formed by having a telescopic rod 113 having a head 115 at one end sleeved with a telescopic tube 114 having a head 115' at one end, and the two ends of the first compression spring 11 is pressed against the two heads (115, 115') of the first telescopic sleeve 112 in a reverse direction. A second positioning groove 242 is provided between the two second curved grooves (241, 241'). Two ends of the second positioning groove 242 are respectively in communication with the two second curved grooves (241, 241') for positioning a second telescopic member 12. In one embodiment, the second telescopic element 12 may have the same structure as the first telescopic element 11, and the second telescopic element 12 includes a second compression spring 121 and a second telescopic sleeve 122, and the second compression spring 121 is sleeved with the second telescopic sleeve 122, and the second telescopic sleeve 122 is formed by having a telescopic rod 123 having a head 125 at one end sleeved with a telescopic tube 124 having a head 125' at one end. Two ends of the second compression spring 121 are pressed against the two heads (125, 125') of the second telescopic sleeve 122 in opposite directions. In the second embodiment, the present invention is further simplified as follows: two parallel rails and a gear 29 are provided only between the two curved guiding portions of the curved base 21. The cover plate 22 covers and is connected with the top surface of the curved base 21.

The first rotating member 3 includes a first connecting portion 31 and two first curved blocks (32, 32'). The first connecting portion 31 includes two first supporting rods (311, 311'), and the two second supporting rods (311, 311') are connected with the lateral side of one end of the first support plate 91 of the first body 96, and another ends of the two first supporting rods (311, 311') respectively extend to form two parallel first curved blocks (32,32'), and the two first curved blocks (32,32') are swingable and respectively limited within the two curved guiding grooves of the first curved guiding portion 23. The two first curved blocks (32, 32') have at least four recesses on the opposite inner surfaces, the at least four recesses are set into two groups with two recessed as one group, and each group is respectively provided to be pressed against two end heads (115,115') of the first telescopic member 11, wherein one of the groups is used as a first positioning part 38, and the other group is used as another first positioning part 381 for the positioning of the flexible display 93 when one half of the flexible display 93 is unfolded and folded. Another lateral end of the first curved block 32' has a first pivoting shaft 326.

The second rotating member 4 includes a second connecting portion 41 and two second curved blocks (42, 42'), the second connecting portion 41 includes two second supporting rods (411, 411'), and two second supporting rods (411, 411') are connected with lateral side of one end of the second supporting plate 92 of the second body 97. Another ends of the two second supporting rods (411, 411') are respectively extended to form two parallel second curved blocks (42, 42'). The two second curved blocks (42, 42') are swingable and respectively limited within the two curved guiding grooves of the second curved guiding portion 24. The two second curved blocks (42, 42') have at least four recesses on the opposite inner surfaces, and the at least four recesses are set into two groups with two recesses as a group, and each group are provided to be pressed against two end heads (125,125') of the second telescopic element 12. One of the groups is used as a second positioning part 48, and the other group is used as another second positioning part 481 for the positioning of the flexible display 93 when the other half of the flexible display 93 is unfolded and folded. Another lateral end of the second curved block 42' has a second pivoting shaft 426.

One lateral side of the first linkage member 5' has a rack 53 meshing with one side of the gear 29. Another lateral side of the first linkage member 5' has a first pivoting hole 54 for being pivotally connected with the first pivoting shaft 326 at another lateral end of the first curved block 32', such that the inner wall surface of the first pivoting hole 54 is directly pressed through the first pivoting shaft 326, such that when the first rotating member 3 is rotated, the first linkage member 5' is driven to be moved linearly. The first pivoting hole 54 is in an elongated shape and recessed from another lateral end surface of the first linkage member 5'. In this way, in the process of the first pivoting shaft 326 swinging along with the first curved block 32', it is not only able for the first pivoting shaft 326 to be pivotally rotated, it is also to form a space for the first pivoting shaft 326 to be slightly moved.

The second linkage member 6' has the same structure as the first linkage member 5', and they are oppositely symmetrical on two sides of the gear 29. One lateral end of the second linkage member 6' has a rack 63, and the rack 63 meshes with another side of the gear 29. Another lateral end of the second linkage member 6 has a second pivoting hole 64 for being pivotally connected with the second pivoting shaft 426 at another lateral end of the second curved block 42'. In this way, the inner wall surface of the second pivoting hole 64 is directly pressed through the second pivoting shaft 426, such that when the first rotating member 3 and the second rotating member 4 are rotated reversely, the second linking member 6' is driven to be moved linearly. The second pivoting hole 64 is in an elongated shape and recessed from another lateral end surface of the second linkage member 6'. In the process of the second pivoting shaft 426 swinging along with the second curved block 42', it is not only able for the second pivot shaft 426 to be pivotally rotated, it is also able to form a space for the second pivoting shaft 426 to be slightly moved.

In this way, in the process that the first body 96 is rotated to be folded or fully unfolded relative to the second body 97, when the second rotating member 4 is rotated relative to the first rotating member 3, the first linkage member 5' and the second linkage member 6' can be rotated synchronously and reversely with the gear 29 as the rotation axis by driving the first linkage member 5' and the second linkage member 6'. The two end heads (115, 115') of the first telescopic element 11 are simultaneously introduced and pressed against one set of the first positioning portion 38 or the other set of the first positioning portion 381, and the two end heads (125, 125') of the second telescopic element 12 are simultaneously introduced and pressed against one set of the second positioning part 48 or the other set of the second positioning parts 481, such that the first rotating member 3 and the second rotating member 4 can be simultaneously positioned at a predetermined swing angle. During the relative swing of the two first curved blocks (32, 32') and the two second curved blocks (42, 42'), after each set of the first positioning portions (38,381) is guided by the two end heads (115, 115') of the first telescopic member 11, the two end heads (115, 115') of the first telescopic member 11 will be continuously pressed against the opposite inner lateral surfaces of the two first curved blocks (32,32'), and after each set of the second positioning portions (48,481) is guided by the two end heads (125, 125') of the second telescopic member 12, the two end heads (125, 125') of the second telescopic member 12 will be continuously pressed against the opposite inner lateral surfaces of the two second curved blocks (42,42'). Such arrangements can respectively produce friction to generate torsion force, such that the first body 96 and the second body 97 can be rotated synchronously and stably, and can be synchronously stopped at a certain angle when being rotated. When the two parallel first supporting plates 91 and the second supporting plate 92 are folded with each other, a sufficient accommodating space 94 can be formed for accommodating the bending portion of the flexible display 93 with a small curvature.

Accordingly, the present invention has the following advantages:

1. The present invention adopts "dual virtual rotation centers" by using two rotating members to rotate synchronously with respect to the curved body to replace the compensation operation generated by the "shaft-free seesaw" structure, and when the two rotating members are folded, the two bodies is not completely folded, while an accommodating space for accommodating the curved portion of the flexible display is still retained. Therefore, such arrangement can effectively simplify the operation of the hinge module, thereby reducing the overall thickness to facilitate the design, so as to meet the market demand of being lighter and thinner to promote sales, and thereby effectively respond to the small curvature limitation of existing flexible displays during the folding process, so as to prolong the service life of flexible displays.
2. When the two rotating members of the present invention are folded relative to each other, each sliding block and each linkage member can be moved on each corresponding track of the curved body. Therefore, such arrangement not only can form a stable multi-point support, but also can have the two rotating members rotated more stably and smoothly.
3. Each torsion bar and each torsion member of the present invention can simultaneously provide frictional torsion and can share the load, such that the two rotating members can be relatively stably rotated, and can be freely stopped at a certain angle during rotation, which can further carries out a torsional changes of light opening and heavy closing and be stopped at a specific angle. Each torsion bar and each torsion member can be made by stacking a plurality of pieces, and can also be manufactured integrally for corresponding implementations in actual situations, thereby increasing the flexibility in use.
4. When the two rotating members of the present invention are folded in a reverse direction, the combination of the outer plane of the lateral convex shaft and the inner plane of the pivoting shaft hole and/or the elastic member and the positioning ball can be used to make the inner and outer planes correspondingly connected with each other; or a positioning ball is provided in each positioning groove. Therefore, such arrangement can produce an effective or more significant positioning effect, so that the two rotating members can be more firmly positioned at a specific angle to be easily used.
5. In addition to that the second embodiment of the present invention is more effective than the first embodiment in removing part of components and simplifying the shaft connection structure of the "first and second linkage assemblies", so as to reduce the production cost of the components and simplify manufacturing and assembly processes, the arrangement of the second embodiment also can allow the two bodies to be fully folded when the two bodies are rotated in a reverse direction, so as to effectively hide the flexible display, and to have the two halves of the flexible display to be smoothly unfolded, and to prolong the service life of the flexible display. Secondly, there are at least one guiding rail structure member as a detachable component in both bodies, and the at least one guiding rail structure member can be easily replaced, such that the second and third guiding rails can be applicable to the bodies of different sizes and structures or to the first guiding rails of the curved bodies having different structures. Such arrangement helps to increase the scope of application of the present invention and provides flexibility in structural design and use.

The description referred to in the drawings and stated above is only for the preferred embodiments of the present invention. Many equivalent variations and modifications can still be made by those skilled in the field of the present invention without departing from the spirit of the present invention, so they should be regarded to fall into the scope defined by the appended claims.

What is claimed is:

1. A hinge device, comprising:
a curved body, having two lateral surfaces that are opposite to each other, where a first curved guiding portion and a second curved guiding portion are juxtaposed and spaced from each other between the two lateral surfaces;
a first rotating member, including a first connecting portion and at least one first curved block, where the first connecting portion is connected with a first support plate; the at least one first curved block is swingable and limited within the first curved guiding portion;
a second rotating member, including a second connecting portion and at least one second curved block, where the second connecting portion is connected with a second support plate, and the at least one second curved block is swingable and limited within the second curved guiding portion;
a first linkage assembly, having one end pivotally connected with one side of the first curved block of the first rotating member, and another end provided with a first linkage member; and
a second linkage assembly, having one end pivotally connected with one side of the second curved block of the second rotating member, and another end provided with a second linkage member, where the second linkage member is in a reversely movable connection with the first linkage member.

2. A hinge device, comprising:
a curved body, having two lateral surfaces that are oppositely provided, where a first curved guiding portion and a second curved guiding portion are juxtaposed and spaced from each other between the two lateral surfaces;
a first rotating member, including a first connecting portion and at least one first curved block, where the first connecting portion is connected with a first support plate; the at least one first curved block is swingable and limited within the first curved guiding portion; a lateral end of the at least one first curved block has at least one first positioning portion for pressing one end of a first telescopic element, thereby limiting a swing angle of the at least one first curved block;
a second rotating member, including a second connecting portion and at least one second curved block, where the second connecting portion is connected with a second support plate, and the at least one second curved block is swingable and limited within the second curved guiding portion;

a lateral end of the at least one second curved block has at least one second positioning portion for pressing one end of a second telescopic element, thereby limiting a swing angle of the at least one second curved block;

a first linkage member, having one end pivotally connected with another lateral end of the at least one first curved block of the first rotating member, thereby when the at least one first curved block is swung, the first linkage member is moved linearly; and a second linkage member, in a reversely movable connection with the first linkage member, wherein one end of the second linkage member is pivotally connected with another lateral end of the at least one second curved block of the second rotating member, thereby when the at least one second curved block is swung, the second linkage member is moved linearly.

3. A foldable device using the hinge module claimed in claim 2, comprising a first body, a second body, and a flexible display, wherein the first support plate is pivotally provided in the first body, and the second support plate is pivotally provided in the second body; the first support plate and the second support plate are respectively connected with two halves of the flexible display, and are rotated respectively in the first body and the second body; a first lateral guiding rail is provided on one lateral surface of the curved body, a second lateral guiding rail is provided in a lateral surface of one end of the corresponding second body, and a third lateral guiding rail is provided on a lateral surface of one end of the corresponding first body; the second lateral guiding rail and the third lateral guiding rail are respectively connected with the first lateral guiding rail and are moved relatively with the first lateral guiding rail, so as to guide and limit the two support plates to rotate at a limited angle respectively, such that the first body and the second body are respectively rotated around a virtual rotation center to be unfolded or folded relative to the curved base body; when the foldable device is folded, a sufficient accommodating space is formed between the first support plate and the second support plate that are parallel for accommodating a bending portion of the flexible display.

4. The foldable device claimed in claim 3, wherein the first lateral guiding rail includes two convex protruding columns from one lateral surface of the curved body, and the corresponding second lateral guiding rail and the third lateral guiding rail are curved grooves respectively formed in a lateral surface of one end of the second body and the first body.

5. The foldable device claimed in claim 4, wherein at least one rail structure member is detachably locked onto one end bottom surface of the second body, and an extension piece is bent and extended from one end of the at least one guiding rail structure member to be embedded into a lateral surface of one end surface of the adjacent second body, and the second lateral guiding rail is arranged on the surface of the extension piece to guide and limit one protruding column of the first lateral guiding rail.

6. The foldable device claimed in claim 4, wherein at least one rail structure member is detachably locked onto one end bottom surface of the first body, and an extension piece is bent and extended from one end of the at least one guiding rail structure member to be embedded into a lateral surface of one end of the adjacent first body, and the third lateral guiding rail is arranged on the surface of the extension piece to guide and limit with another protruding column of the first lateral guiding rail.

7. The foldable device claimed in claim 4, wherein of the second body has another end provided with a first fixing member, and one end of the second support plate is pressed against one end of the curved body to be aligned with the top surface thereof for being connected with the second connection portion of the second rotating member; another end of the second support plate is connected with a first connecting member, one end of the first connecting member is pivotally connected with the first fixing member, such that the second lateral guiding rail and the first lateral guiding rail are relatively moved and guided and limited with each other, thereby the second support plate is rotated at a limited angle in the second body.

8. The foldable device claimed in claim 7, wherein the first fixing member includes a base and an upper cover, a gap is formed in the middle of the base, and two opposite sides of the gap are respectively recessed to form a pivoting hole; one end of the first connecting member has a pivoting shaft and an inclined surface extending from the pivoting shaft toward a bottom surface of the first connecting member, and two opposite shaft ends of the pivoting shaft are respectively pivotally connected with the two pivoting holes of the first fixing member.

9. The foldable device claimed in claim 4, wherein the first body has another end provided with a second fixing member, and one end of the first support plate is pressed against one end of the curved body to be aligned with the top surface thereof for being connected with the first connection portion of the first rotating member; another end of the first support plate is connected with a second connecting member, one end of the second connecting member is pivotally connected with the second fixing member, such that the third lateral guiding rail and the first lateral guiding rail are relatively moved and guided and limited with each other, thereby the first support plate is rotated at a limited angle in the first body.

10. The foldable device claimed in claim 9, wherein the second fixing member includes a base and an upper cover, a gap is formed in the middle of the base, and two opposite sides of the gap are respectively recessed to form a pivoting hole; one end of the second connecting member has a pivoting shaft and an inclined surface extending from the pivoting shaft toward a bottom surface of the second connecting member, and two opposite shaft ends of the pivoting shaft are respectively pivotally connected with the two pivoting holes of the second fixing member.

11. The foldable device claimed in claim 3, wherein of the second body has another end provided with a first fixing member, and one end of the second support plate is pressed against one end of the curved body to be aligned with the top surface thereof for being connected with the second connection portion of the second rotating member; another end of the second support plate is connected with a first connecting member, one end of the first connecting member is pivotally connected with the first fixing member, such that the second lateral guiding rail and the first lateral guiding rail are relatively moved and guided and limited with each other, thereby the second support plate is rotated at a limited angle in the second body.

12. The foldable device claimed in claim 11, wherein the first fixing member includes a base and an upper cover, a gap is formed in the middle of the base, and two opposite sides of the gap are respectively recessed to form a pivoting hole; one end of the first connecting member has a pivoting shaft and an inclined surface extending from the pivoting shaft toward a bottom surface of the first connecting member, and two opposite shaft ends of the pivoting shaft are respectively pivotally connected with the two pivoting holes of the first fixing member.

13. The foldable device claimed in claim 3, wherein the first body has another end provided with a second fixing member, and one end of the first support plate is pressed against one end of the curved body to be aligned with the top surface thereof for being connected with the first connection portion of the first rotating member; another end of the first support plate is connected with a second connecting member, one end of the second connecting member is pivotally connected with the second fixing member, such that the third lateral guiding rail and the first lateral guiding rail are relatively moved and guided and limited with each other, thereby the first support plate is rotated at a limited angle in the first body.

14. The foldable device claimed in claim 13, wherein the second fixing member includes a base and an upper cover, a gap is formed in the middle of the base, and two opposite sides of the gap are respectively recessed to form a pivoting hole; one end of the second connecting member has a pivoting shaft and an inclined surface extending from the pivoting shaft toward a bottom surface of the second connecting member, and two opposite shaft ends of the pivoting shaft are respectively pivotally connected with the two pivoting holes of the second fixing member.

\* \* \* \* \*